US008234151B1

(12) United States Patent
Pickton et al.

(10) Patent No.: US 8,234,151 B1
(45) Date of Patent: Jul. 31, 2012

(54) SYSTEMS AND METHODS FOR ESTIMATING DEMAND FOR ATTRACTIONS

(75) Inventors: Kacie Maiken Pickton, West Hollywood, CA (US); David Barel, Los Angeles, CA (US)

(73) Assignee: Kick Drum, LLC, West Hollywood, CA (US)

( * ) Notice: Subject to any disclaimer, the term of this patent is extended or adjusted under 35 U.S.C. 154(b) by 0 days.

(21) Appl. No.: 13/297,134

(22) Filed: Nov. 15, 2011

Related U.S. Application Data

(60) Provisional application No. 61/499,636, filed on Jun. 21, 2011.

(51) Int. Cl.
*G06Q 10/00* (2006.01)
(52) U.S. Cl. .................................................. 705/7.31
(58) Field of Classification Search .................. 705/7.31
See application file for complete search history.

(56) References Cited

U.S. PATENT DOCUMENTS

| | | | |
|---|---|---|---|
| 7,672,866 | B2 | 3/2010 | Venkatraman et al. |
| 7,725,402 | B2 * | 5/2010 | Booth ............................. 705/65 |
| 7,725,575 | B2 | 5/2010 | Matsumoto |
| 7,937,380 | B2 * | 5/2011 | Spiegelman et al. ......... 707/705 |
| 8,010,404 | B1 | 8/2011 | Wu et al. |
| 2002/0123924 | A1 * | 9/2002 | Cruz ............................... 705/10 |
| 2007/0276719 | A1 | 11/2007 | Franco |
| 2009/0006184 | A1 | 1/2009 | Leach et al. |
| 2009/0228371 | A1 * | 9/2009 | Williams ........................ 705/27 |
| 2010/0010870 | A1 | 1/2010 | Millar et al. |
| 2010/0076968 | A1 | 3/2010 | Boyns et al. |
| 2010/0185486 | A1 | 7/2010 | Barker et al. |
| 2010/0268556 | A1 * | 10/2010 | Booth, Jr. ......................... 705/5 |
| 2011/0295669 | A1 * | 12/2011 | Stiebel ....................... 705/14.19 |
| 2012/0059848 | A1 * | 3/2012 | Krishnamoorthy ........... 707/770 |

OTHER PUBLICATIONS

Daniel S. Putler and Shilpa Lele. "An Easily Implemented Framework for Forecasting Ticket Sales to Performing Arts Events." Marketing Letters, Dec. 2003, vol. 14 Issue 4,doi:10.1023/B:MARK.0000012474.56171.e9.*
Charles B. Weinberg and Kenneth M. Shachmut. "Arts Plan: A Model Based System for Use in Planning a Performing Arts Series." Management Science, vol. 24, No. 6 (Feb. 1978).*
Sitaram Asur and Bernardo A. Huberman. 2010. Predicting the future with social media. In Proc. Of WIIAT. (2010) http://www.arxiv.org arXiv:1003.5699v1.*
FanShake website of Jan. 2, 2010, downloaded on Mar. 21, 2012 from webarchive.org.*
Mark Glaser, "Nettwerk CEO Terry McBride Puts Fans in Charge of Bands." PBS website Dec. 11, 2008.*
Christopher Knab. "Getting Gigs and Marketing Your Music." musicbizacademy.com Apr. 2010.*

* cited by examiner

*Primary Examiner* — Lynda Jasmin
*Assistant Examiner* — George H Walker
(74) *Attorney, Agent, or Firm* — Knobbe, Martens, Olson & Bear, LLP

(57) ABSTRACT

Certain embodiments disclosed herein provide devices, systems, and methods of using location-based virtual audience feedback to estimate interest in an attraction at one or more venues. Certain embodiments provide devices, systems, and methods of using location-based virtual audience feedback and/or other audience data to estimate interest in a plurality of attractions or other items of interest at a particular venue.

7 Claims, 23 Drawing Sheets

SYSTEMS AND METHODS FOR ESTIMATING DEMAND FOR ATTRACTIONS

RELATED APPLICATION

This application claims the benefit under 35 U.S.C. §119(e) of U.S. Provisional Patent Application No. 61/499,636, filed Jun. 21, 2011, titled "SYSTEMS AND METHODS FOR MATCHING VENUES AND ATTRACTIONS," the entire contents of which are incorporated by reference herein and made a part of this specification.

BACKGROUND

1. Field

This disclosure relates to information systems technology and to technology for estimating demand for attractions.

2. Description of Related Art

Places of interest, such as amusement parks, museums, convention centers, zoos, campuses, theaters, clubs, concert halls, performing arts centers, hospitals, retail stores, and shopping malls, often host attractions or talent that draw an audience. A talent or attraction that has widespread popularity, such as, for example, well-known or popular artists, performers, exhibits, restaurants, shops, products, services, productions, shows, and rides, can generate a predictable return on investment for venue operators. An operator that fills its venue with lesser-known attractions or talent may face greater risk of audience indifference and financial failure. The relative scarcity of attractions and talent with widespread popularity may cause venue operators to take a risk on an unproven item. Existing techniques for matching venues with attractions and/or talent suffer from various drawbacks.

SUMMARY

Example embodiments described herein have several features, no single one of which is indispensible or solely responsible for their desirable attributes. Without limiting the scope of the claims, some of the advantageous features of some embodiments will now be summarized.

Certain embodiments disclosed herein provide devices, systems, and methods of using location-based virtual audience feedback to estimate interest in an attraction or talent at one or more venues. Certain embodiments provide devices, systems, and methods of using location-based virtual audience feedback and/or other audience data to estimate interest in a plurality of attractions or other items of interest at a particular venue.

Advantageously, the location-based virtual audience feedback may allow audience members that have not been measured by traditional metrics, such as surveys, to express their interest in and demand for an attraction, product, or service. Thus, the systems and methods described herein may advantageously detect demand from the grassroots without needing to pass through a filter of record labels, media executives, or the like. In this way, the systems and methods disclosed herein can help attractions that have not been recognized by traditional channels to achieve success based on direct feedback and indications of interest from individual consumers.

A provider of a good or service determines how to allocate or distribute the good or service by predicting or guessing where there will be demand for the good or service. Information about actual demand for many goods and services may be incomplete or nonexistent, thereby causing the provider to rely on geographic, demographic, technographic, psychographic, and/or other market segmentation data to make an informed guess about the level of demand in a particular region. In some cases, the provider may use opinions or popular beliefs about a region to guess the level of demand. Market segmentation data, opinions, and popular beliefs can have widely varying accuracy and can form an imperfect picture of the actual demand for the good or service. Further, such data, opinions, popular beliefs, and other widely-available information may provide little or no insight into demand for certain goods and services, particularly goods and services that are new or not widely known.

Access to pertinent and timely information about actual demand for a good or service has traditionally been rare. Providers seeking such information have used tools such as opinion polls, surveys, and market sampling to collect data reflecting actual demand. The cost of using these and other market research tools that are provider-driven can be prohibitively high, particularly when the good or service in question does not already have widespread popularity. In addition, it may be difficult for such tools to identify rapid changes in interest for a good or service, which might cause a provider to miss a substantial market opportunity. Such difficulties can also affect an operator of a venue that seeks to match the venue with suitable goods, services, or other attractions.

A venue operator often seeks to place attractions at its venue that draw an audience and make the venue profitable and/or successful. The operator of a mall seeks to place retail stores in the mall that will strongly draw shoppers from the region surrounding the mall. A hospital operator brings in doctors and medical equipment that will provide medical care demanded by the population in a target area. A concert hall operator brings in performers that are popular in the area where the concert hall is located. A venue operator might be unable to judge the demand for an attraction that is not widely known, even though concentrations of interest in the attraction might exist in the immediate vicinity of the venue.

In some embodiments, a demand prediction system is configured to receive indications of interest in one or more attractions directly or indirectly from consumers. The system can use the indications of interest, information about the geographic location of the consumers, and other collected data to predict the actual demand for an attraction. The system can be configured to generate a demand prediction for an attraction within a defined geographical region or within other defined parameters (such as, for example, within a defined market segment). In certain embodiments, a demand prediction system is configured to generate a demand prediction for multiple attractions within a defined market segment, for an attraction within multiple defined market segments, and/or for multiple attractions within multiple defined market segments.

Some embodiments provide a system for predicting demand for a good, service, or other attraction in a market segment based on direct or indirect indications of interest generated by consumers. For example, a demand prediction system can be configured to predict the size of an audience for an attraction if the attraction were to be hosted at a particular venue. The system can include or be connected to sources of attraction information and venue information. The term "attraction" is used in its broad and ordinary sense and includes, without limitation, persons (such as, for example, artists, performers, entertainers, and professionals); exhibits (such as, for example, art collections, artifacts, rare items, and product displays); businesses (such as, for example, retailers and service providers); shows (such as, for example, dramatic presentations, musical performances, comedy routines, and variety shows); acts; goods; services; other items that draw interest from consumers; and combinations of items. The term "consumer" is used in its broad and ordinary sense and includes, without limitation, a prospective purchaser of a good or service, a potential member of an audience, or any other person within a market segment, including a person who does not need to pay money to consume an item of interest. The term "venue" is used in its broad and ordinary sense and includes, without limitation, a plot of land, a building, a development, a hall, a theater, a sport facility, a music facility, or another geographic location.

A demand prediction system can receive indications of interest for an attraction from consumers. The demand prediction system can be configured to receive other consumer data, including, for example, location information for individual consumers, a participation metric based on a rate of consumer participation in past events, and a social influence metric based on how actions of consumers influence others and/or how consumers are influenced by others. The demand prediction system can use the indications of interest and other consumer data to predict the demand for the attraction if it were to be matched with the venue. The demand prediction can be sent to an operator of the attraction or to an operator of the venue.

As indicated above, the methods and systems described herein provide a general mechanism for matching consumer demand to any type of attraction. The embodiments disclosed herein are not limited to any particular type of attraction. However, to provide concrete examples of how the systems and methods may be used, particular illustrative examples of the use of the systems and methods in particular industries will now be described. A person of ordinary skill in the art will understand that the inventions are not limited to these examples.

For example, some embodiments provide a system for matching a venue with one or more performers. The system can include a database that stores information about venues for holding performances, performers that perform acts of entertainment, and fans of the performers. The system can include a computer that has access to the database and that is configured to receive indications of interest from fans. Each indication of interest can be an action taken by a fan that shows that the fan is interested in a specific performer. The system can determine, based upon the indications of interest, interest metrics representing individual fans' degree of interest in specific performers. The system determines distances between geographic locations of fans and venues. The system can determine participation metrics representing each fan's rate of participation in past performances. In some embodiments, the system is configured to determine social influence metrics that represent the likelihood that a fan will be influenced by the actions of others.

The system can calculate likelihoods that specific fans will attend the performance by a specific performer at a specific venue. The calculation can take into account the interest metrics, distances, participation metrics, and social influence metrics gathered by the system. The system can calculate an estimate of the attendance at a performance by a performer at a specific venue by summing the likelihoods that specific fans will attend the performance. The system can use the estimate of attendance to match a venue with the performer.

In some embodiments, the system includes a fan feedback subsystem configured to record the fan actions that constitute indications of interest. The fan feedback subsystem can include a user interface element operable by the fans to indicate interest in a particular performer. The user interface element can be configured to be operated repeatedly. A value of an interest metric can be based on the number of times that the user interface element is operated. The number of times and interval when a fan can operate the user interface element can be limited by one or more thresholds. The interest metrics, distances, participation metrics, and social influence metrics can be weighted according to their relative importance in calculating the likelihoods of attendance.

The interest metrics can be based at least in part on indications of how recently an indication of interest occurred. The interest metrics can be used to calculate estimated attendance at performances by performers that are similar to specific performers for whom fans have made previous indications of interest.

Some embodiments provide a system for calculating a total participation estimate for one or more attractions at a venue. The system can include a data store the stores data associated with members of the perspective audience for the one or more attractions and a computing device in communication with the data store. The computing device can be configured to receive data directly or indirectly from members of the perspective audience. The data received from members of the audience can include, for example, for each individual member of the perspective audience, an attraction interest metric based on actions taken by an audience member indicating interest in a particular attraction and a location metric based on the geographic location of the audience member. The computing device can be configured to calculate an individual participation expectation value for each individual member of the perspective audience. The individual participation expectation value can be calculated at least partially from the attraction interest metric of the audience member and the distance between the geographic location of the audience member and the venue. The computing device can be configured to calculate the total participation estimate for at least one of the one or more attractions if the at least one of the one or more attractions were to be placed at the venue by summing the individual participation expectation values of the perspective audience members.

The computing device can be configured to receive the attraction interest metric by tracking a number of times when a member of the perspective audience operates a user interface element configured to register interest in an attraction. The computing device can be configured to receive the attraction interest metric by tracking a number of times when a member of the prospective audience searches for an attraction using the World Wide Web. The computing device can be configured to receive the attraction interest metric by receiving information about the interests of a member of the prospective audience.

The computing device can be configured to receive the location metric by obtaining geographical location information automatically from an electronic device used by the audience member. The computing device can be configured to receive the location metric by receiving Global Positioning System data. The computing device can be configured to receive the location metric by logging an IP address of an electronic device used by the audience member.

Certain embodiments provide a computer-implemented method for estimating participation in one or more attractions at a venue. The method can include receiving data directly or indirectly from members of the perspective audience for the one or more attractions. The data can include, for each individual member of the perspective audience, an attraction interest metric based on actions taken by an audience member indicating interest in a particular attraction and one or more additional metrics, the one or more additional metrics including a social influence metric based on how actions of the audience member influence other members of the perspective audience. The method can include calculating an individual participation expectation value for each individual member of the perspective audience. The individual participation expectation value can be calculated at least partially from the attraction interest metric of the audience member and social influence metrics of members of the perspective audience. The method can include calculating a total participation estimate for at least one of the one or more attractions if the at least one of the one or more attractions were to be placed at the venue by summing the individual participation expectation values of the prospective audience members.

The one or more additional metrics can include a participation metric based on a rate of audience member participation in past attractions. The one or more additional metrics can include a location metric based on a geographic location of the audience member. The individual participation expectation value is calculated at least partially from the participation metric, the location metric, and the location of the venue. The attraction interest metric can be based on a number of times when a member of the perspective audience operates a user interface element configured to register interest in an attraction.

Some embodiments provide a system for generating a demand prediction for an event. The system can include a database that stores information about an attraction, venues that are capable of hosting the attraction, and consumers who may have interest in the attraction. A computer that has access to the database can be configured to receive indications of interest from at least some of the consumers. Each indication of interest can be generated by an action performed by an interested consumer using an electronic device configured to send indications of interest to the computer. Each indication of interest indicates that the interested consumer may have interest in the attraction or interest in a category of attractions to which the attraction belongs. In certain embodiments, the computer is configured to receive location information that identifies a location corresponding to each interested consumer. Interest metrics representing a level of interest in the attraction for each interested consumer can be determined. The interest metrics can be based at least partially on the received indications of interest. Likelihoods that specific consumers would attend an event at a specific venue featuring the attraction can be calculated. The calculation can take into account the interest metrics, the location information, a location of the specific venue, other information, or a combination of information. The computer is configured to calculate a demand prediction for the event by summing the likelihoods that specific consumers would attend the event.

The computer can be configured to receive indications of interest by receiving a notification when the at least one of the consumers uses an electronic device to search for an attraction. Other activities, including, for example, visiting an attraction profile page, operating a user interface element adapted to express consumer interest in an attraction, or connecting with a person associated with an attraction on a social network, can also trigger notifications to the computer that the consumer may have interest in the attraction.

In some embodiments, the computer is configured to determine social influence metrics representing likelihoods that consumers will be influenced by actions of others and account for the social influence metrics in calculating the likelihoods that specific consumers would attend the event. The computer can be configured to determine participation metrics representing a rate of participation in past events for each interested consumer and account for the participation metrics in calculating the likelihoods that specific consumers would attend the event.

In certain embodiments, the computer is configured to estimate the profitability of the event, based at least partially on the demand prediction for the event. The computer can be configured to provide information about one or more events that are estimated to be most profitable to an agent for the attraction. The computer can be configured to identify one or more geographical regions where the demand prediction is highest and match the attraction with a proposed venue within each of the one or more geographical regions. In some embodiments, the proposed venue would result in an event with the highest estimated profitability compared to other venues within the geographical region of the proposed venue.

Certain embodiments provide a computer-implemented method of calculating a demand prediction for an event. The method can include receiving indications of interest from consumers, wherein each indication of interest is generated by an action performed by an interested consumer using an electronic device, and wherein each indication of interest shows that the interested consumer may have interest in an attraction or interest in a category of attractions to which the attraction belongs. Location information that identifies a location corresponding to each interested consumer is received. The method can include determining interest metrics representing a level of interest in the attraction for each interested consumer, wherein the interest metrics are based at least partially on the received indications of interest. Likelihoods that specific consumers would attend an event at a specific venue featuring the attraction are calculated. The calculation can take into account the interest metrics, the location information, a location of the specific venue, other factors, or a combination of factors. A demand prediction for the event can be calculated by summing the likelihoods that specific consumers would attend the event.

The method can include identifying one or more geographical regions where there is a concentration of interest in the attraction, based on one or more demand predictions. The attraction can be matched with a proposed venue within each of the one or more geographical regions. The proposed venue can be selected such that the projected profitability of the event at the proposed venue is greater than or equal to the projected profitability of an event featuring the same attraction at another venue within the same geographical region as the proposed venue.

The method can include determining social influence metrics representing likelihoods that consumers will be influenced by actions of others and accounting for the social influence metrics in calculating the likelihoods that specific consumers would attend the event. In some embodiments, the method includes determining participation metrics representing a rate of participation in past events for each interested consumer and accounting for the participation metrics in calculating the likelihoods that specific consumers would attend the event.

In certain embodiments, the method includes weighting the interest metrics and the location information according to their relative importance in calculating the likelihoods that specific consumers would attend the event. The interest metrics can be based in part on how recently the indications of interest occurred, on a number of times that a consumer operates a user interface element configured to register interest in the attraction, on other factors, or on a combination of factors.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers may be reused to indicate correspondence between reference elements.

DETAILED DESCRIPTION OF PREFERRED EMBODIMENTS

Figure 1A:
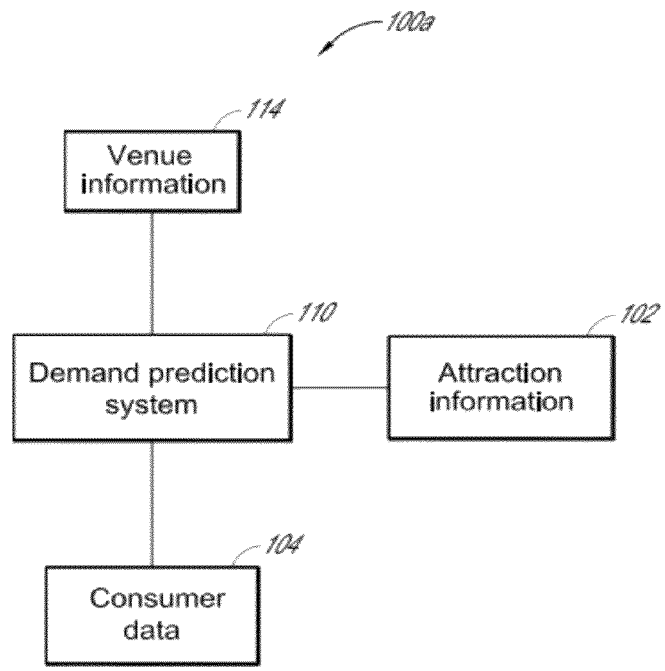
FIG. 1A illustrates an embodiment of a system for predicting demand for an attraction at a venue.

Although certain preferred embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

A provider of a good or service determines how to allocate or distribute the good or service by predicting or guessing where there will be demand for the good or service. Information about actual demand for many goods and services may be incomplete or nonexistent, thereby causing the provider to rely on geographic, demographic, technographic, psychographic, and/or other market segmentation data to make an informed guess about the level of demand in a particular region. In some cases, the provider may use opinions or popular beliefs about a region to guess the level of demand. Market segmentation data, opinions, and popular beliefs can have widely varying accuracy and can form an imperfect picture of the actual demand for the good or service. Further, such data, opinions, popular beliefs, and other widely available information may provide little or no insight into demand for certain goods and services, particularly goods and services that are new or not widely known.

Access to pertinent and timely information about actual demand for a good or service has traditionally been rare. Providers seeking such information have used tools such as opinion polls, surveys, and market sampling to collect data reflecting actual demand. The cost of using these and other market research tools that are provider-driven can be prohibitively high, particularly when the good or service in question does not already have widespread popularity. In addition, it may be difficult for such tools to identify rapid changes in concentrations of interest for a good or service, which might cause a provider to miss a substantial market opportunity. Such difficulties can also affect an operator of a venue that seeks to match the venue with suitable goods, services, or other attractions.

A venue operator often seeks to place attractions at its venue that draw an audience and make the venue profitable and/or successful. The operator of a mall seeks to place retail stores in the mall that will strongly draw shoppers from the region surrounding the mall. A hospital operator brings in doctors and medical equipment that will provide medical care demanded by the population in a target area. A concert hall operator brings in performers that are popular in the area where the concert hall is located. A venue operator might be unable to judge the demand for an attraction that is not widely known, even though concentrations of interest in the attraction might exist in the immediate vicinity of the venue.

In some embodiments, a demand prediction system is configured to receive indications of interest in one or more attractions directly or indirectly from consumers. The system can use the indications of interest, information about the geographic location of the consumers, and other collected data to predict the actual demand for an attraction. The system can be configured to generate a demand prediction for an attraction within a defined geographic region or within other defined parameters (such as, for example, within a defined market segment). In certain embodiments, a demand prediction system is configured to generate a demand prediction for multiple attractions within a defined market segment, for an attraction within multiple defined market segments, and/or for multiple attractions within multiple defined market segments.

II. Example Demand Prediction System Embodiments

FIG. 1A illustrates an embodiment of a system 100a for predicting demand for a good, service, or other attraction in a market segment based on direct or indirect indications of interest generated by consumers. In an example embodiment, a demand prediction system 110 is configured to predict the size of an audience for an attraction if the attraction were to be hosted at a particular venue. The system 110 can include or be connected to sources of attraction information 102 and venue information 114. The term "attraction" is used in its broad and ordinary sense and includes, without limitation, persons (such as, for example, artists, performers, entertainers, and professionals); exhibits (such as, for example, art collections, artifacts, rare items, and product displays); businesses (such as, for example, retailers and service providers); shows (such as, for example, dramatic presentations, musical performances, comedy routines, and variety shows); acts; goods; services; other items that draw interest from consumers; and combinations of items. The term "consumer" is used in its broad and ordinary sense and includes, without limitation, a prospective purchaser of a good or service, a potential member of an audience, or any other person within a market segment, including a person who does not need to pay money to consume an item of interest. The term "venue" is used in its broad and ordinary sense and includes, without limitation, a plot of land, a building, a development, a hall, a theater, a sport facility, a music facility, or another geographic location.

The demand prediction system 110 receives indications of interest in one or more attractions from consumers. The demand prediction system 110 can be configured to receive other consumer data 104, including, for example, a distance metric based on the distance between a geographic location of the audience member and the venue, a participation metric based on a rate of audience member participation in past attractions, and a social influence metric based on how actions of the audience member influence or are influenced by others. The demand prediction system 110 uses the indications of interest and other consumer data 104 to predict the demand for the attraction if it were to be matched with the venue. The demand prediction can be sent to an operator of the attraction or to an operator of the venue.

Figure 1B:
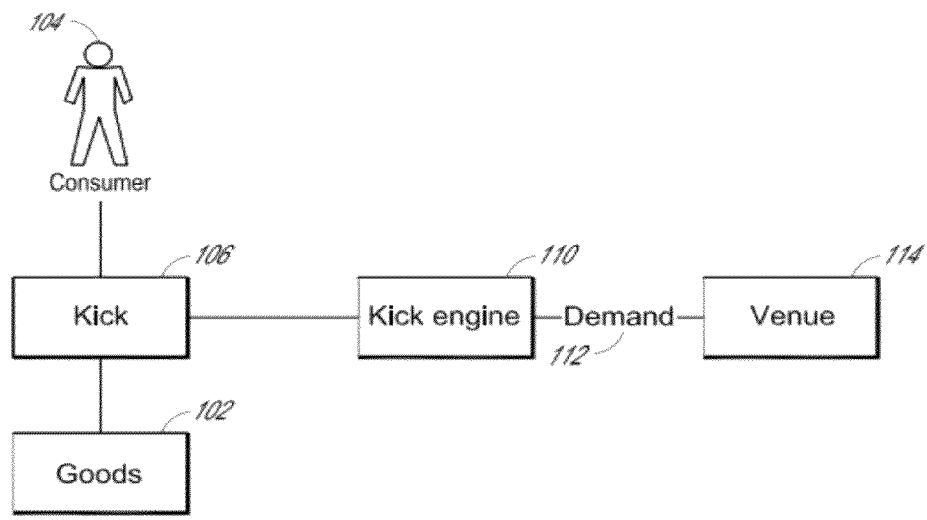
FIG. 1B is a schematic diagram of a technique for predicting demand for goods at a venue.

The schematic diagram shown in FIG. 1B illustrates a technique for predicting demand 112 for goods 102 at a venue 114. In the illustrated diagram, a consumer 104 generates indications of interest (generally referred to herein as "kicks") 106 that indicate that the consumer 104 is interested in consuming one or more goods 102. The kicks 106 can be generated by actions of the consumer 104 that directly or indirectly indicate interest in the goods 102. Examples of such indications of interest can include, without limitation, search engine queries, social network connections, direct virtual indications of interest (for example, generated by operating a user interface element on a Web page or in an application program), website visits, purchases of goods or services, purchases of event tickets, other consumer behaviors, or a combination of behaviors. The kicks 106 or information about the kicks 106 can be counted, measured, or otherwise collected by an analysis system (generally referred to herein as a "kick engine") 110 configured to generate a demand prediction 112 from the kicks 106 and/or other information about the consumer 104. For example, the kick engine 110 can calculate a probability that the consumer 104 will consume the goods 102. The kick engine 110 can be configured to generate a demand prediction 112 by tabulating the probabilities that each consumer 104 in a geographic region will consume the goods 102. The demand prediction 112 can be sent to an operator of the venue 114, who can use the demand prediction 112 to make decisions about what goods 102 to bring to its venue 114.

Figure 1C:
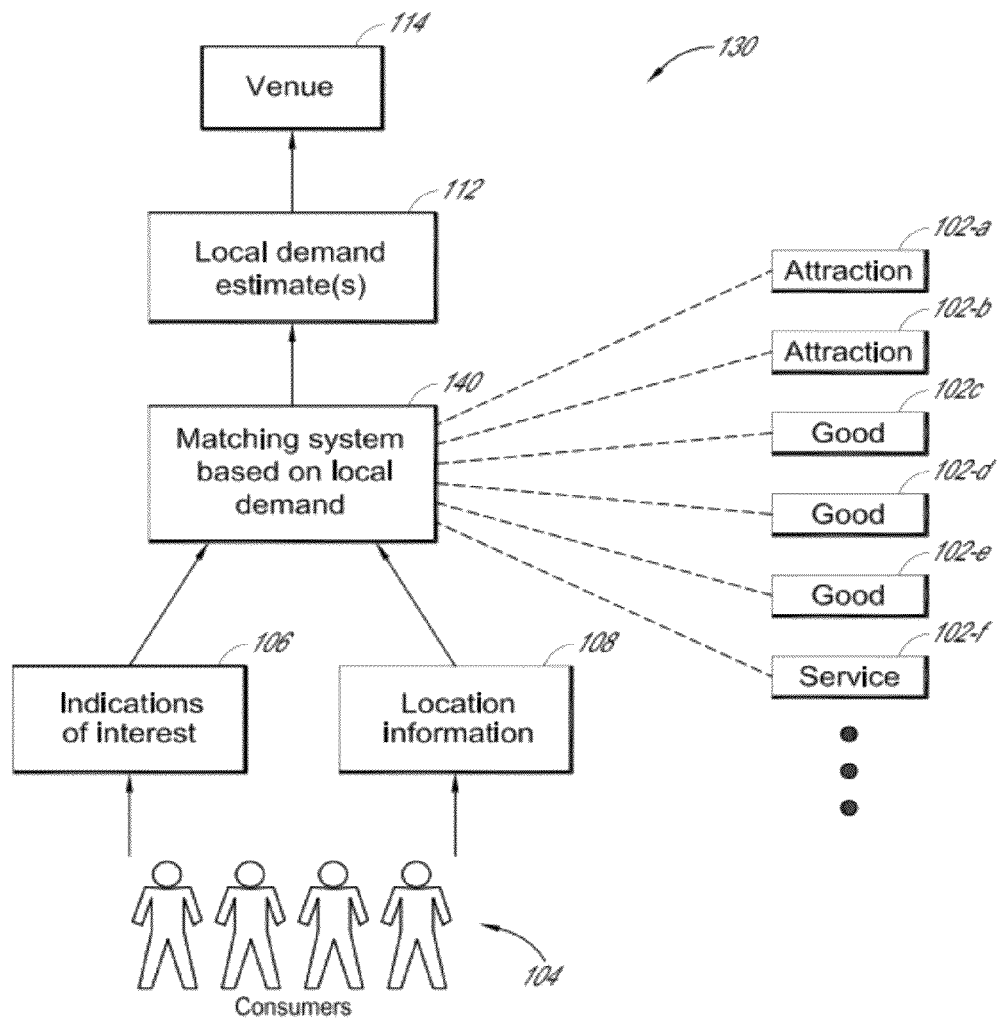
FIG. 1C illustrates an embodiment of a system for matching attractions with a venue based on demand.

FIG. 1C is a schematic diagram of a system 130 for matching a venue 114 with one or more goods, services, or other attractions 102. In the embodiment illustrated in FIG. 1C, a group of consumers 104 within a market segment generate direct or indirect indications of interest 106 in one or more attractions, goods, or services 102. A matching system 140 receives the indications of interest 106 and location information 108 from the group of consumers 104. The location information 108 can be provided by the consumers 104 or can be collected from other information available to the matching system 140, such as, for example, location data shared by an electronic device, IP address information, wired or wireless network location information, public records, other sources, or a combination of sources. In some embodiments, the matching system 140 uses confidentiality controls, such as, for example, data encryption, a private key, a secured connection, other data security techniques, or a combination of techniques, in order to protect the location information 108 from third party inspection. In certain embodiments, the matching system 140 is configured to anonymize the indications of interest 106, the location information 108, and/or other data collected by the matching system 140 such that it cannot be connected to a particular consumer.

The matching system 140 can include a data store of information about goods, services, and other attractions 102 in which the consumers 104 may have interest. A provider of an attraction can create a profile associated with the attraction that allows consumers 104 to identify the attraction. In some embodiments, the matching system allows the provider to communicate with one or more consumers 104. In this manner, the provider can promote its attraction or provide news or other updates regarding its attraction. The matching system 140 is configured to generate a local demand estimate 112 for the attraction using the indications of interest 106 and the location information 108 received from the consumers 104. The matching system 140 sends the local demand estimates 112 for one or more attractions 102 to the operator of a venue 114. The operator can use the local demand estimates 112 in selecting one or more attractions 102 to bring to its venue 114.

Figure 1D:
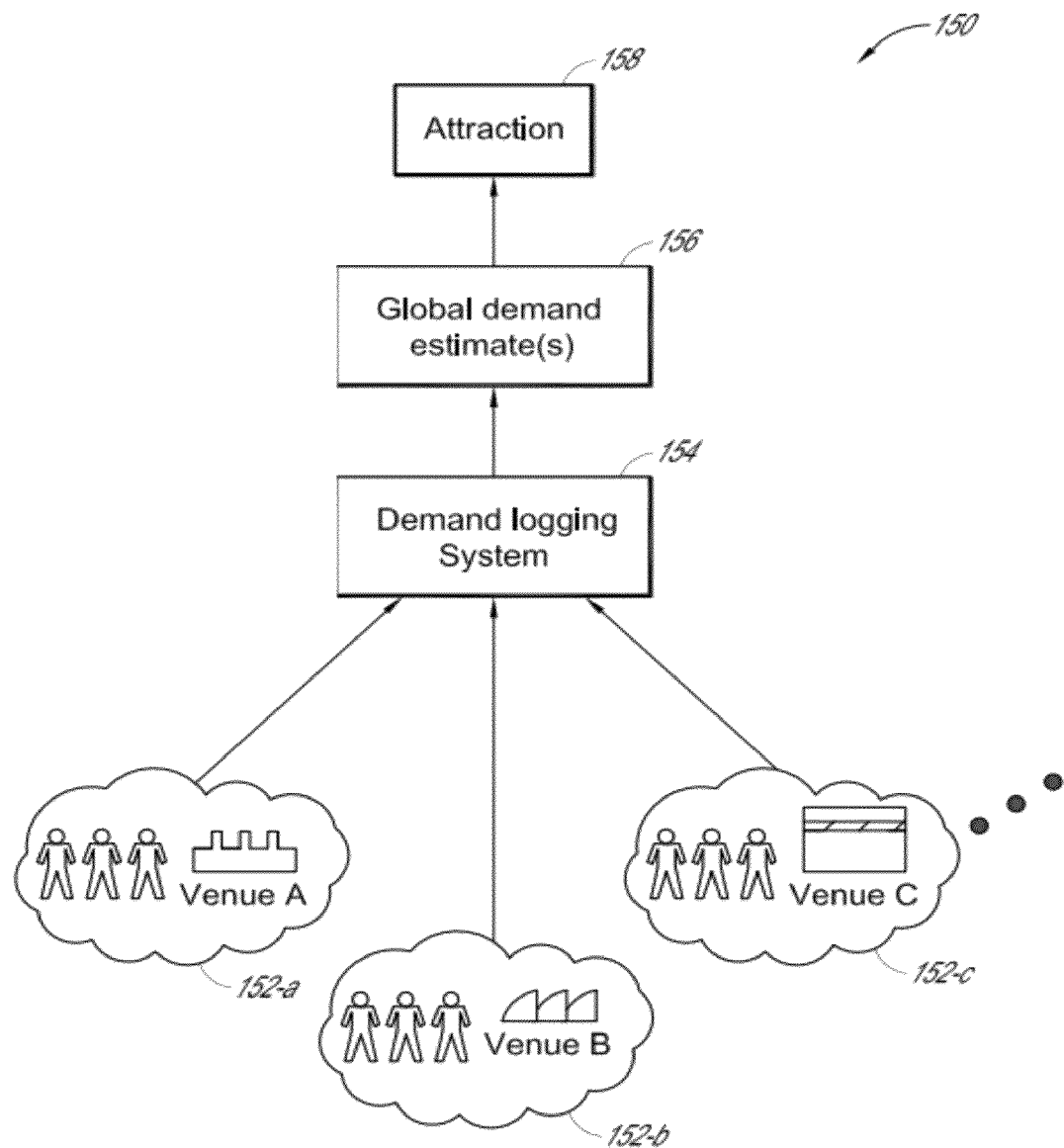
FIG. 1D illustrates an embodiment of a system for scheduling an attraction based on demand.

FIG. 1D illustrates an embodiment of a system 150 for scheduling an attraction based on demand. For example, the system 150 can be configured to assist in scheduling a tour or rotation for an attraction 158 at a plurality of venues. In the illustrated embodiment, a demand logging system 154 receives data from consumers within a plurality of market segments 152-a, 152-b, 152-c. As an example, each market segment can be a geographical region surrounding a venue. The market segments can be selected by a user of the system 150 or can be selected automatically by the system 150. The demand logging system 154 can be configured to receive indications of interest in the attraction 158 from consumers in the plurality of market segments. The system 154 uses the indications of interest and/or other consumer data to generate a global demand estimate 156 for the attraction 158. The global demand estimate 156 can include demand estimates for all market segments in which interest was indicated, for all market segments in which interest exceeded a threshold value, for a desired number of market segments, for a selection of market segments, or for any other desired market segment or combination of market segments. In certain embodiments, the system 154 can identify one or more market segments 152 where there is a concentration of interest in the attraction 158. The demand logging system 154 sends the global demand estimates 156 to the operator of the attraction 158. The operator can use the global demand estimates 156 in selecting one or more venues for the attraction 158 to visit.

Figure 2A:
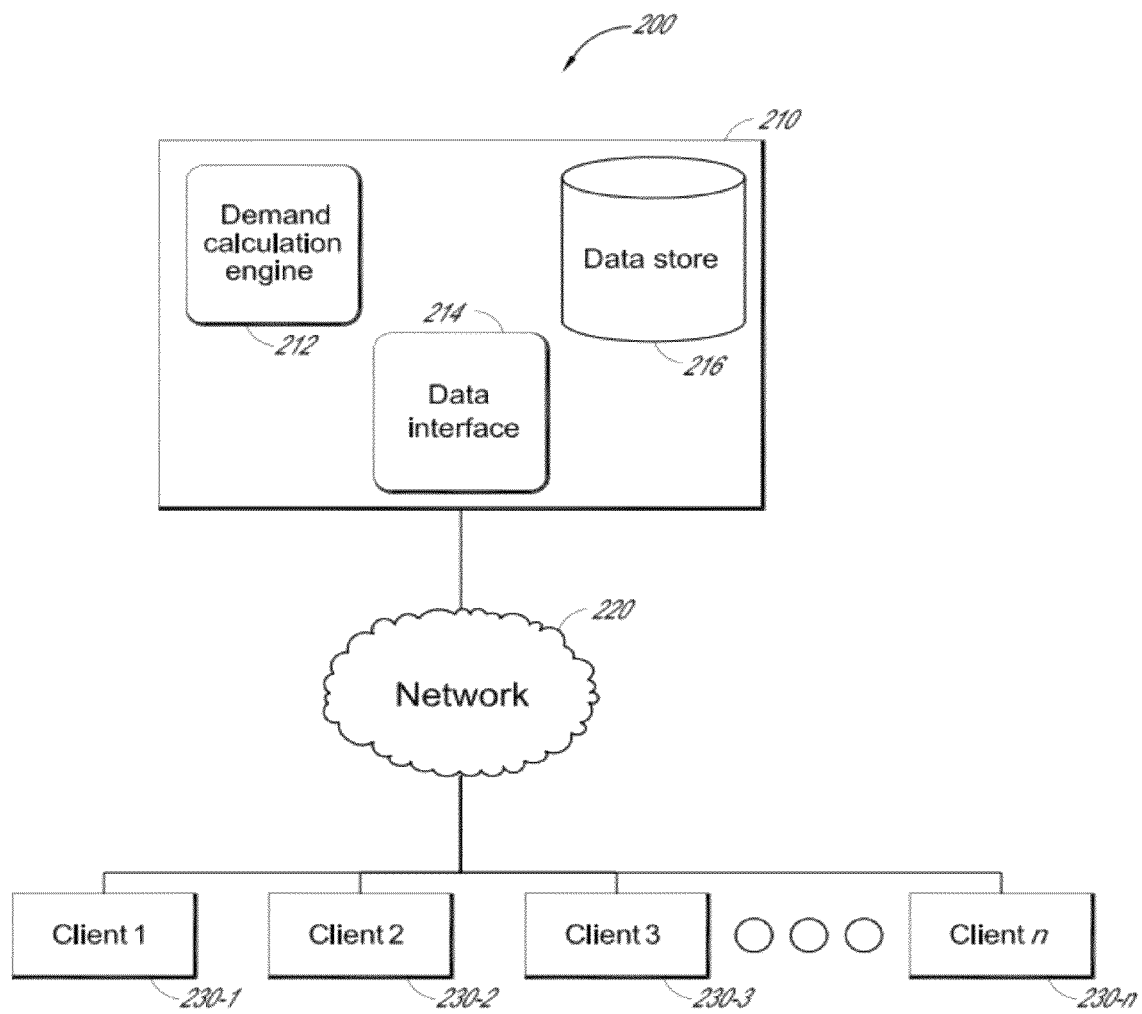
FIG. 2A illustrates an embodiment of a demand prediction system.

FIG. 2A illustrates an embodiment of a demand prediction system 200. The demand prediction system 200 includes a computing system 210 connected to a plurality of clients 230 via a network 220. The computing system 210 can be a personal computer, a workstation, a server, a blade, or a combination of computing systems including one or more processors, memory, storage, and a network interface for communicating with the network 220. In some embodiments, the computing system 210 includes a plurality of computing devices interconnected via the network 220. Each of the computing devices can generally resemble the computing system 210.

In some embodiments, the computing system 210 includes one or more processors. The processors can be one or more general purpose single-core or multi-core microprocessors such as, for example, a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, an ALPHA® processor, etc. In addition, one or more of the processors can be a special purpose microprocessor such as a digital signal processor.

The computing system 210 can also include a network interface module that facilitates communication between the computer system 210 and clients 230 via the communications network 220.

The network interface module can use a variety of network protocols. In one embodiment, the network interface module implements TCP/IP. However, it is to be appreciated that other types of network communication protocols such as, for example, Point-to-Point Protocol ("PPP"), Server Message Block ("SMB"), Serial Line Internet Protocol ("SLIP"), tunneling PPP, AppleTalk, Ethernet, Wi-Fi, etc., may also be used.

The computing system 210 can include memory. Memory can include, for example, processor cache memory (such as processor core-specific or cache memory shared by multiple processor cores), dynamic random-access memory ("DRAM"), static random-access memory ("SRAM"), or any other type of memory device capable of storing computer data, instructions, or program code. The computing system 210 can also include optional storage. Storage can include, for example, one or more hard disk drives, floppy disks, flash memory, magnetic storage media, CD-ROMs, DVDs, optical storage media, or any other type of storage device capable of storing computer data, instructions, and/or program code.

The computing system 210 may be used in connection with various operating systems such as: Microsoft® Windows® 3.X, Windows 95®, Windows 98®, Windows NT®, Windows 2000®, Windows XP®, Windows Vista, Windows 7, Windows CE®, Palm Pilot OS, OS/2, Apple® MacOS®, MacOS X®, MacOS X Server®, Disk Operating System (DOS), UNIX, Linux®, VxWorks, or IBM® OS/2®, Sun OS, Solaris OS, IRIX OS operating systems, etc.

In some embodiments, the computing system 210 includes a data interface 214 configured to communicate with the clients 230. For example, the data interface 214 can include program code for receiving indications of interest, receiving other data, sending demand predictions, sending other data, and/or communicating configuration information to the clients 230. The computing system 210 can maintain a data store 216 that contains information used by the demand calculation engine 212 and/or the data interface 214. The demand calculation engine 212 includes program code for generating a demand prediction using indications of interest received from clients 230 and/or from other data available to the computing system 210.

As can be appreciated by one of ordinary skill in the art, the computing system 210 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way.

In embodiment illustrated in FIG. 2A, the computing system 210 communicates with a plurality of clients 230. Each of the clients can be a personal computer, a laptop computer, a handheld computing device, a portable computing device, a server, a computer workstation, a local area network of individual computers, an interactive kiosk, a personal digital assistant, an interactive wireless communications device, a handheld computer, an embedded computing device, or the like, including one or more processors, memory, storage, and a network interface for communicating with the network 220, as described above. The clients 230 can be used by consumers, operators of attractions, operators of venues, artists, advertisers, administrators, and others that send information to or receive information from the computing system 210.

The communications network 220 may include one or more of any type of electronically connected group of computers including, for instance, the following networks: a virtual private network, a public Internet, a private Internet, a secure Internet, a private network, a public network, a value-added network, a wired network, a wireless network, an intranet, etc. In addition, the connectivity to the network can be, for example, a modem, Ethernet (IEEE 802.3), Gigabit Ethernet, 10-Gigabit Ethernet, Token Ring (IEEE 802.5), Fiber Distributed Datalink Interface (FDDI), Frame Relay, InfiniBand, Myrinet, Asynchronous Transfer Mode (ATM), or another interface. The communications network 220 may connect to the computing system 210 and the clients 230, for example, by use of a modem or by use of a network interface card that resides in each of the systems.

In addition, the same or different communications networks 220 may be used to facilitate communication between the first client 230-1 and the computing system 210, between the second client 230-2 and the computing system 210, between the third client 230-3 and the computing system 210, and between the any other client 230-$n$ and the computing system 210.

Figure 2B:
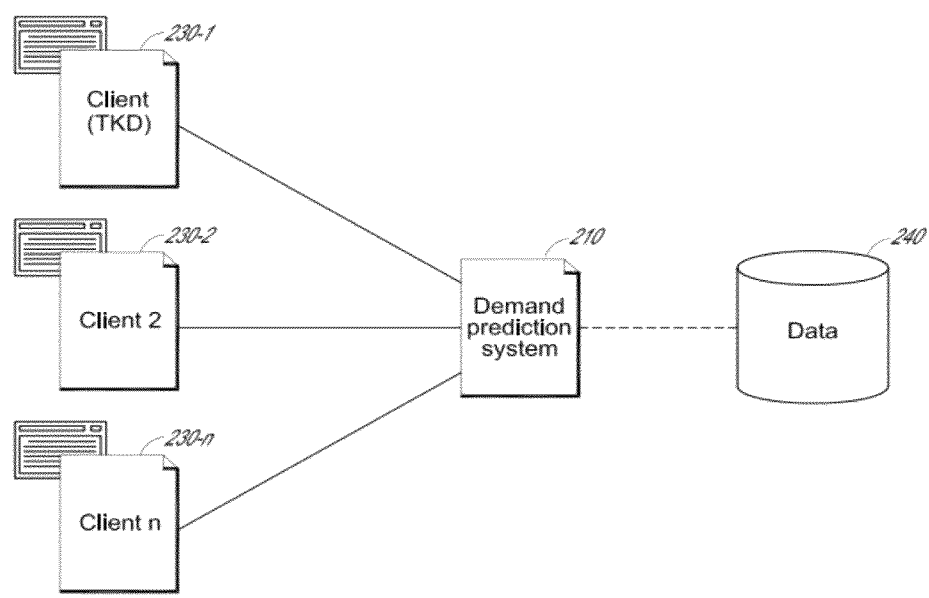
FIG. 2B illustrates another embodiment of a demand prediction system.

FIG. 2B is a schematic diagram of a demand prediction system 210 connected to clients 230 and a data storage system 240. In some embodiments, the demand prediction system 210 receives indications of interest, other consumer information, attraction profiles, venue information, and so forth from the clients 230. The demand prediction system 210 uses the indications of interest and/or other consumer information to generate a demand prediction. For example, the demand prediction system 210 can be configured to determine the demand and/or the probability of purchase of a service, a good, or another attraction in a specific geographic location based on past behavior of consumers and interest expressed in the service, good, or other attraction via virtual indications of interest. The demand prediction and/or the data underlying the demand prediction can be stored in the data storage system 240.

III. Demand Prediction Examples

In some embodiments, the demand prediction system 210 is configured to calculate the probability that each consumer in a market segment will attend a specific event. Data collected from each consumer, such as, for example, data from the consumer's social network and from the consumer's other interactions, including direct and indirect indications of interest, can be used to estimate the probability that the consumer will attend an event, purchase a good, or perform another action with respect to an item of interest. For purposes of illustration and not limitation, example techniques will now be described for estimating the probability that the consumer will participate in an event at a venue and matching an attraction with the venue to create an event.

Figure 3:
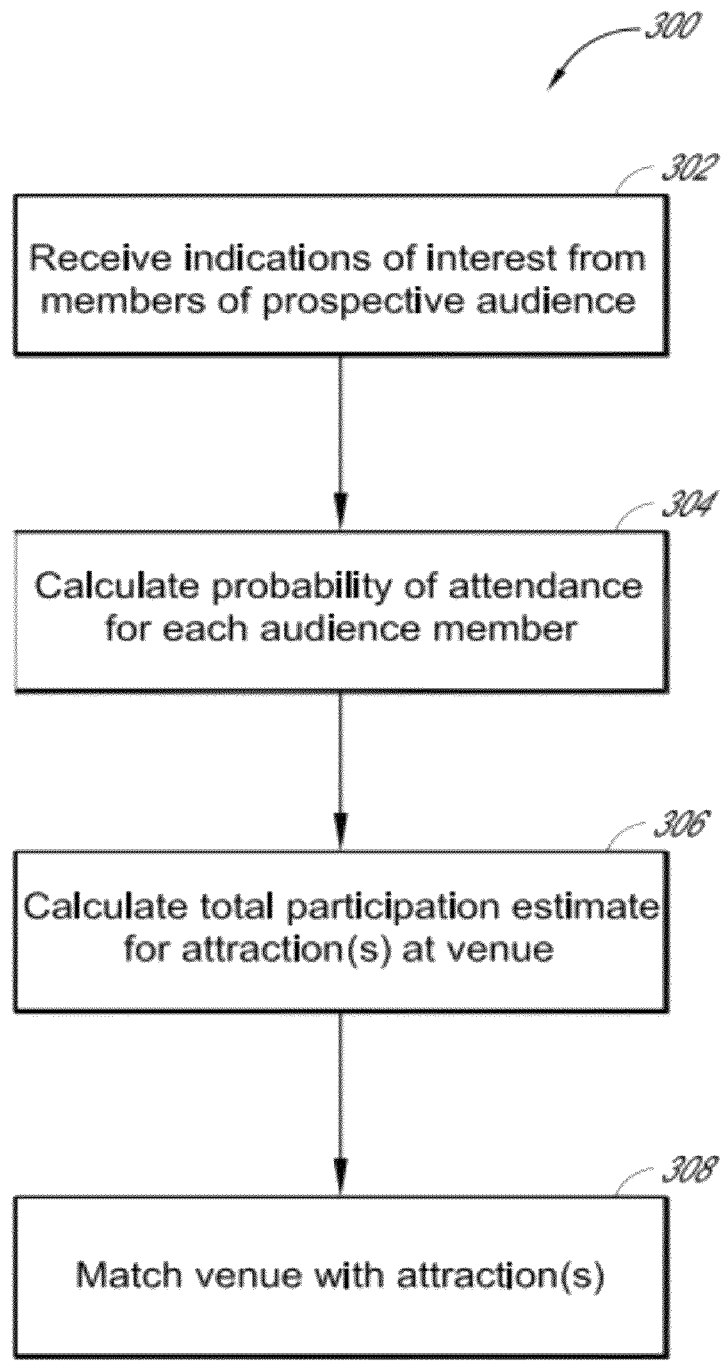
FIG. 3 illustrates a method of matching a venue with one or more attractions.

FIG. 3 shows an embodiment of a method 300 for matching a venue with an attraction to create an event. The method 300 can include receiving indications of interest from members of a prospective audience (302), calculating a probability that each audience member would attend an event at the venue including the attraction (304), calculating a total participation estimate for an event (306), and matching the venue with the attraction (308).

Logistic regression can be used to estimate the probability that each audience member will attend an event, using a variety of categorical, discrete, or continuous variables. In some embodiments, the method 300 is flexible and easy to adapt to new variables that allow the accuracy of the prediction to improve. Logistic regression also provides a way to analyze the utility of individual variables and provides a way to select the best variables to use in predicting attendance.

Figure 4A:
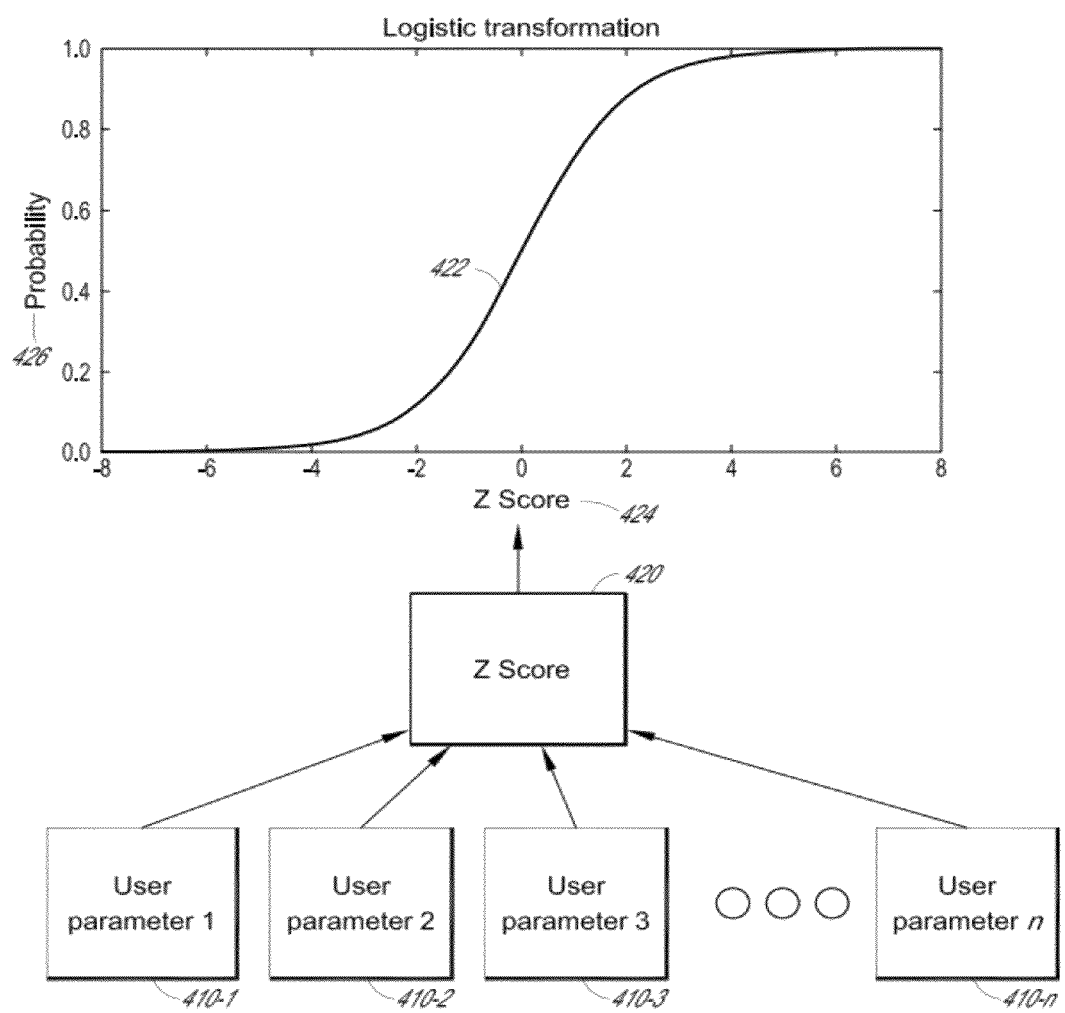
FIG. 4A illustrates an embodiment where a Z score is derived from user parameters.

Each consumer can be associated with a set of features, such as gender, age, history of kicks, history of event attendance, and/or other features. These features are used during the probability calculation as different user parameter values 410 (or $x_i$ values) for each consumer. One or more user parameter values 410 of a consumer are combined into a single value 420 (or Z score), which appears on the horizontal axis 424 in FIGS. 4A and 4B. The Z score 420 can be translated into a probability of attendance, which appears as the vertical axis 426.

The different x values which feed into the Z score can be combined with different weights according to their importance. Logistic regression can be used to pick the best weights to match what actually occurs, given a set of x values that are known.

Techniques for selecting the set of x values to use will now be discussed. In some embodiments, an iterative procedure is used to select the best set of x values from a large set of possible x values. The x values are selected to do the best job of predicting probabilities while minimizing model complexity. In some embodiments, a model of attendance is formulated by starting with relatively few x values that provide a good fit to observed data. Additional x values are added until new values do not provide enough improvement to justify their inclusion in the model.

In certain embodiments, the set of x values includes one or more values provided by the user, such as, for example, age or gender. The set of x values can also include one or more event-dependent values, such as, for example, the distance between the consumer and the venue or a feature of the consumer that is particular to the attraction. The set of x values can include one or more values that can be computed based on the interaction of consumers with a website, such as, for example, the number of times that a consumer has "kicked" or virtually indicated interest in the artist within a recent time period (such as, for example, within the preceding 90 days). The set of x values can include one or more values derived from the interaction of a consumer with his or her social network. There are many ways by which values can be derived from social network events. For example, an x value can be assigned if the consumer has connected with an artist on a social network or has added the artist to a list of hobbies or personal preferences. Additionally, the effect of the consumer's social network on behavior can be considered. A consumer that frequently follows another person by repeating the actions of the other person can be identified as influenced by that person. Information about the activities of influential persons can be used to better estimate the actions of a consumer.

Different models of participation can be used for an individual consumer depending on the type of information available for the consumer. For a consumer who does not have much history from which to derive x values or who has not shared social network details, a different model may better determine the probability of attendance than for a consumer who has a wealth of data available. For this reason, different models can be trained for different groups of users. Consumers for whom little data is available can be modeled using a simple model that does not include some or all of the x values available for other consumers.

A. Attendance Model

In some embodiments, attendance at an event can be modeled as a Bernoulli distributed random variable, where the probability of attendance is $p_i$:

$$Y_i = \begin{cases} 1 & p_i \\ 0 & 1-p_i \end{cases}$$

The probability of attendance can be modeled as a function of user features. User features are what is known about the consumer from his or her virtual indications of interest, from other activities, and from information collected from his or her social network.

B. Examples of Features Used in Logistic Regression

In certain embodiments, a logistic regression model employs a plurality of useful statistics to represent user information. Almost any information can be used as to generate statistics to be used as model parameters. Certain examples of parameters are set forth hereinafter. Additional or alternative parameters can be used, if necessary. Many variations are possible.

Figure 5:
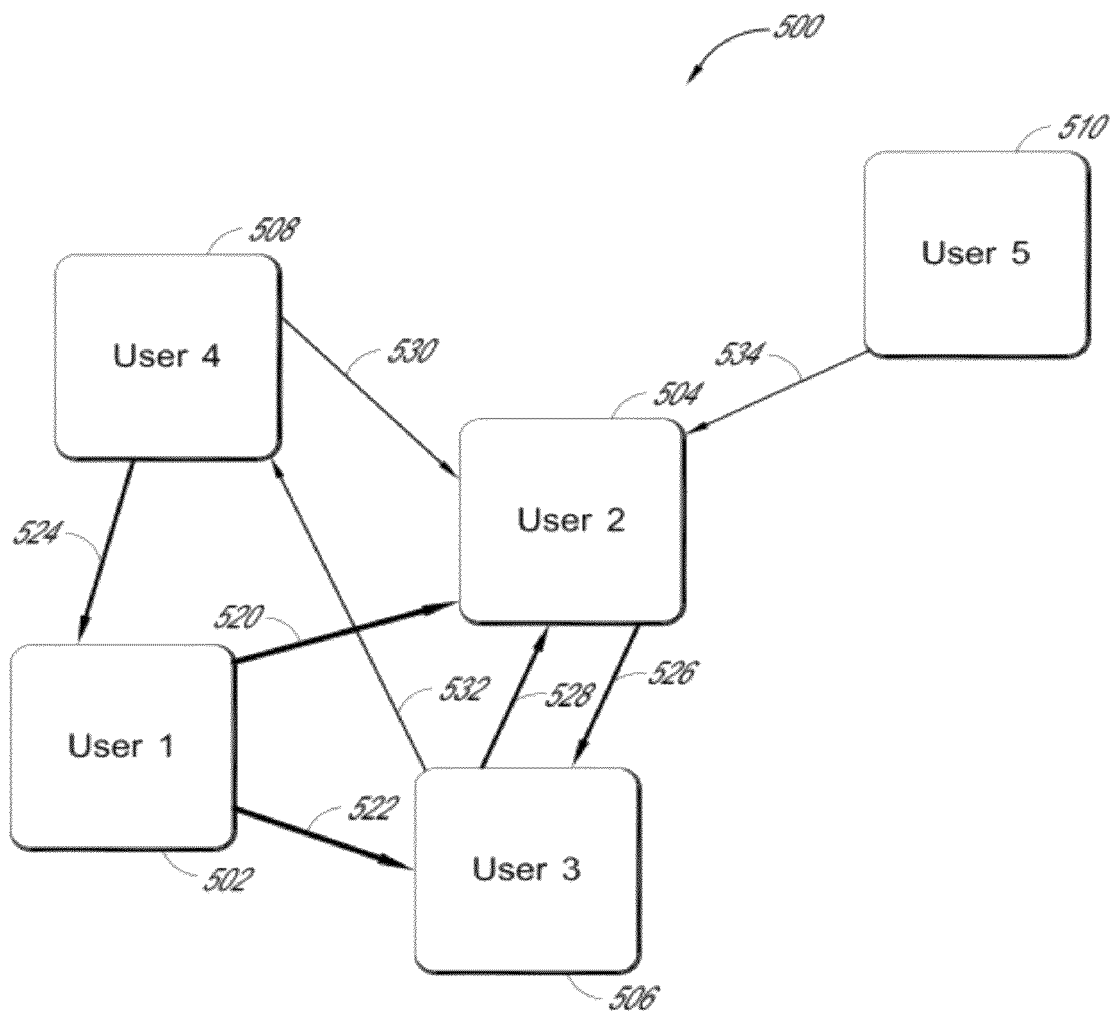
FIG. 5 illustrates an example model of user influence in a social system.

Social influence is an example of a user parameter that can assist in determining a demand prediction. FIG. 5 illustrates an example model of user influence in a social network system 500. Each user 502, 504, 506, 508, 510 shown in FIG. 5 is connected to one or more other users by an arrow 520, 522, 524, 526, 528, 530, 532, 534. Each arrow points in a direction of a user who is influenced by another user of the social network system 500. The weight of the arrow is related to how influential the relationship is. A more influential user 502 can have a stronger effect on the actions of his or her neighbor 504, as represented by a heavy weight arrow 520. As shown in FIG. 5, a user 502 can be influential for some users 504, 506, but not influential for other users 508.

1. Kick History

In some embodiments, each user of a website, application, or mobile application that sends kicks to the demand prediction system has a budget of M kick actions that can be taken per day. Each kick of an artist (or other attraction) is a request for the artist to perform in an event near the user. Kick events can be tracked in different ways. For example, ways of tracking kicks include tracking (1) the total kicks made by a user and (2) the kicks made by a user in a recent window. As used herein, $K_u$ represents the number of all kicks made by the user, and $K^*_u$ represents the number of kicks made in the time window. The number of kicks of artist $a_j$ is $K_{u,a_j}$, and likewise, the number of kicks of the artist in the recent window is $K^*_{u,a_j}$.

There are many ways in which the kick history can be incorporated into the model. A model selection strategy can be used to limit the number of variables using kick data that are included. In the expressions set forth herein, the indicator function I(X) is 1 when statement X is true, and 0 otherwise. The following are examples of user parameters that can be defined using kick history data:

Total Kicks $x_{K^*}$: The total number of times the user u has kicked the artist attending in a recent window.

$$x_{K^*} = K^*_{u,a_j}$$

Fraction Kicks $x_{K^*_f}$: The fraction of the user's recent kicks that are for the artist.

$$x_{K^*_f} = \frac{K^*_{u,a_j}}{K^*_u}$$

Average Fan Kicks $x_{K^*_a}$: The number of kicks the user has compared to the average kicker of the artist in the recent window.

$$x_{K^*_a} = K^*_{u,a_j} \left( \frac{\sum_v I(K^*_{v,a_j} > 0) K^*_{v,a_j}}{\sum_v I(K^*_{v,a_j} > 0)} \right)^{-1}$$

Max Fan Kicks $x_{K^*_m}$ The number of kicks the user has compared to the most kicks made by a fan of this artist.

$$x_{K^*_m} = \frac{K^*_{u,a_j}}{\max_v I(K^*_{v,a_j} > 0) K^*_{v,a_j}}$$

In addition to recording kicks, the origin of the kicks can also be recorded. A user who kicks an artist from a phone as well as two different computers may be considered more serious about the artist. Variables including these parameters can be included in the model.

2. Distance

In certain embodiments, one or more user parameters is based on the distance between a consumer and a venue. For example, distance to the event (d) can be modeled as three distinct variables, each corresponding to a different type of consumer behavior.

$0 < d < L_i$: Within this close distance, the user is expected to almost always attend. Distance is not a barrier to attendance.

$L_i < d < M_i$: In this region, the attendance is expected to decrease with increasing distance. Here distance plays a role in determining the attendance.

$M_i < d$: For more distant concerts, the user is expected to rarely attend. Distance again plays little role, but there is little chance of attendance.

The three distinct distance variables can be written as $x_{d_1}$, $x_{d_2}$, $x_{d_3}$, which are indicator variables that convey the region the distance is within. An interaction term, $$\frac{d - L_i}{M_i - L_i} x_{d_2},$$

allows the model to account for the magnitude of distance when the distance is within the middle range.

3. History of Event Attendance

If E is the set of events where the user kicked the artist before the event took place and where the event took place within distance $M_i$ of the user, the rate of attendance is given by the following expression:

$$x_h = \frac{\sum_{e \in E} I(u \to e)}{|E|}$$

4. Social Network

The friends of a user can be assumed to have some influence on event attendance. In some embodiments, it can be assumed that the attendance of the friends is independent from the user's attendance. Thus, the effect of the user's social network can be measured through static statistics, independent of friends' attendance.

Some simple parameters, which depend only on features of the social network, can be computed. For a user u, the set of users that are friends with u are N(u). Examples of parameters that can be used in the model include:

Number of friends who have kicked the artist in a recent window.

$$x_{N_k} = \sum_{v \in N(u)} I(K^*_{v,a} > 0)$$

Fraction of friends who have kicked the artist.

$$x_{N_f} = \frac{\sum_{a \in N(u)} I(K^*_{v,a} > 0)}{|N(u)|}$$

Whether the user (u) is friends with the artist (a) on a social network.

$$x_f = I(a \in N(u))$$

Many models of social influence are built to anticipate activation of nodes, or the cascade of activity passing through a network. In some embodiments, the model is configured to look further ahead than the next group of users to change state based on the local network. In some embodiments, the demand prediction system does not have complete information on attendance, which would may complicate activation or cascade models.

In certain embodiments, a model uses features of the user's social network as parameters in a logistic regression model. A user parameter can be configured to provide a measure of social influence in the network, for weighting or comparing two users' friends. The demand prediction system can determine weights to associate with users based on their interactions.

A user can carry out many repetitive actions, such as, for example, kicking an artist. In order to account for repetitive actions, the demand prediction system can consider any action that a user performs twice within a certain window as self-influenced, and not available for other users to take credit for. When the demand prediction system has a complete log of all actions taken by all users, it can define influence ($P_{v \rightarrow u}$) of user v on user u as the amount of credit for each of user u's actions that v can take.

The set of actions carried out within a recent window by user u, which can be considered not to be self influenced is given as $A_u$. For each action $a \in A_u$, the model can consider the set of friends of u that have recently carried out the action. The model can assign each of the friends equal fractional credit. The influence of user v on u is the sum of the fractions of all influences of u by v in the time window, over all potential influence events.

The model can define $A_{v \rightarrow u}$ as an action by v that was carried out by u within the time window of influence. $S_{a,u}$ can be defined as the set of users who, like v, carried out the action a before u within the time window. The influence of user v on user u can be expressed as:

$$P_{v \rightarrow u} = \frac{\sum_{a \in A_u} |S_{a,u}|^{-1} A_{v \rightarrow u}}{|A_v|}$$

These influence values can be used as weights in estimating the probability of a user taking action given the social network.

Another parameter that can be used in the model is the ease of influencing a user. If a user frequently follows others, the user may be easily influenced. If the user is the first person in his or her social network to take an action, the user may not be easily influenced. An expression that accounts for ease of influence can include interaction terms and network terms.

One expression that may quantify influenceability is the fraction of actions for which the user was influenced over total actions taken by the user:

$$C_u = \frac{|A_u|}{I(A_{v \rightarrow u})}$$

where I( ) is the indicator function. Influenceability ($C_u$) is analogous to the opposite of influence.

C. Logistic Regression

For each user and event pair, there are a set of features $X_i = (x_{i_1}, x_{i_2}, \ldots, x_{i_n})$, and the response $Y_i$ that was drawn from a Bernoulli with unknown parameter $p_i$.

In this generalized linear model, a linear model of observations is fit to a function of the unknown parameter:

$$g(p_i) = \beta X_i = \beta_0 + \beta_1 x_{i_1} + \ldots + \beta_n x_{i_n}$$

In logistic regression, g is the logit function, which allows for any value produced by the right side to be mapped into a probability, something that would not be possible if the left side were restricted to the range (0, 1).

The $\beta_j$ values are the weights assigned to each explanatory variable $x_j$. Each $x_j$ can be either categorical or continuous.

The $\beta_j$ coefficients can be interpreted as the odds ratio when a unit increase occurs in variable $x_j$. If $x_j$ increases by 1, the probability of attendance increases by a factor of $e^{\beta_j}$.

Figure 4B:
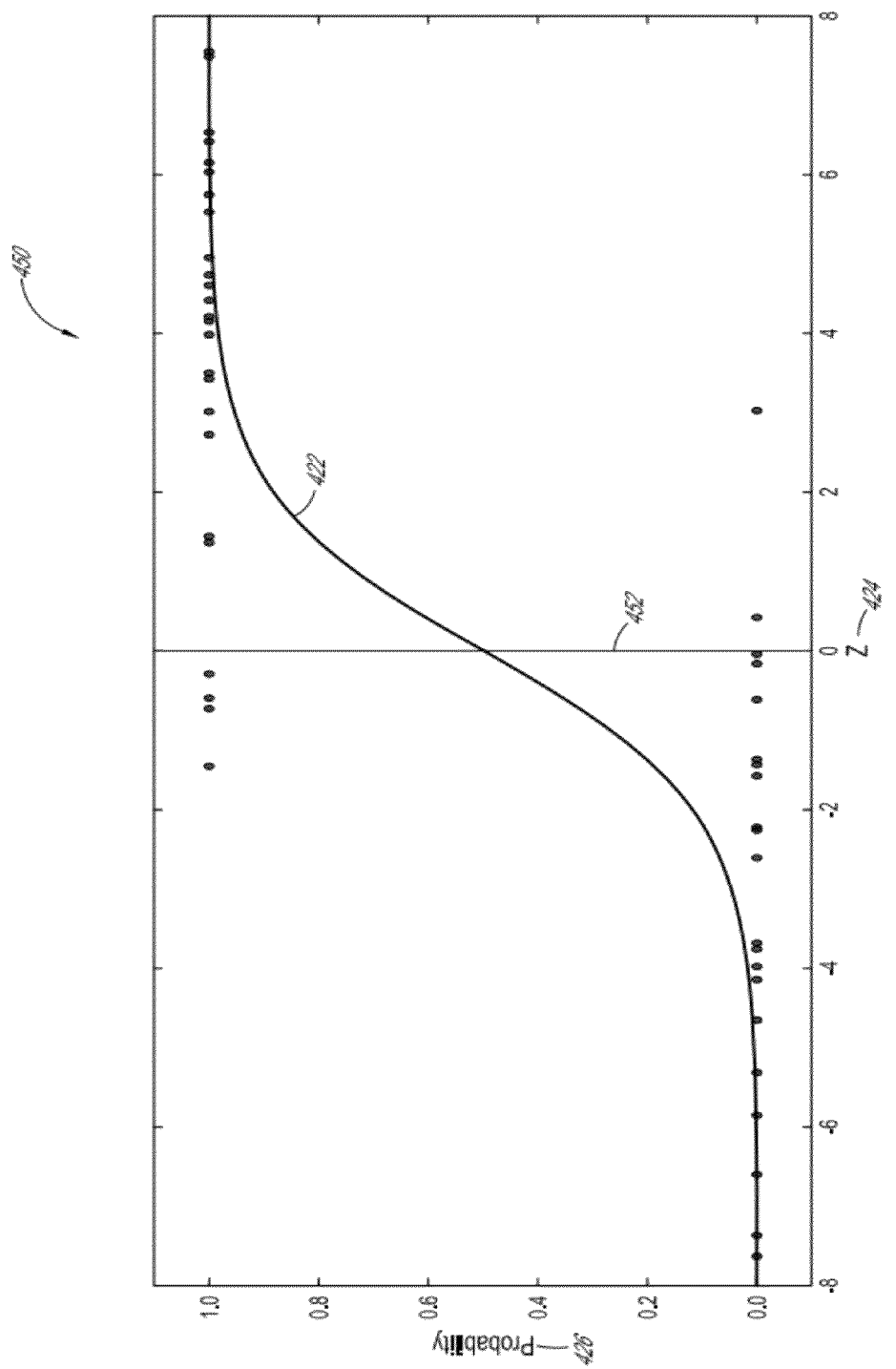
FIG. 4B is a plot showing a mapping between Z score and probability.

In FIG. 4B, a set of 50 users, represented by dots, attend the event (P=1) or do not (P=0) according to the calculated probability from the logistic curve. While attendance is more likely for users with a larger z value, there are still some users who do not attend. The same can be seen for z<0, where a few users do attend, even though the probability of them doing so is below 50%. When the weights for the x values in the z function are chosen, users are assigned probabilities that are similar to actual outcomes.

1. Logit Function

For an event with probability $p_i$, the logit or log odds of the event is:

$$z_i = g(p_i) = \log \frac{p_i}{1 - p_i}$$

Recovering the probability of an event given the independent variables is done by inverting the logit function:

$$p_i = \frac{e_i^x}{1 + e_i^x} = \frac{1}{1 + e^{-z_i}} = \frac{1}{1 + e^{-\beta X_i}}$$

2. Maximum Likelihood Estimators (MLEs)

The user features from known attendance events are used to determine the parameters of a model of attendance probability. If there are m historical data points, with a known response $Y_i$, and observations $X_i$, this data can be used to fit the model:

$$z = \beta X = \beta_0 + \beta_1 x_1 + \beta_2 x_2 + \ldots + \beta_n x_n$$

The β values chosen are the maximum likelihood estimators. The likelihood of the parameters given the data $X_1$, $X_2, \ldots, X_m$ is:

$$L(\beta | X_1, X_2, \ldots, X_m) = \prod_{i=1}^{m} f(X_i | \beta)$$

where $f(X_i|\beta)$ is the density of the distribution.

For a Bernoulli variable, each $Y_i$ either contributes $p_i$ or $1-p_i$ depending on whether it is 1 or 0. The likelihood then is:

$$L(\beta | X_1, X_2, \ldots, X_m) = \prod_{i=1}^{m} p_i^{Y_i} (1 - p_i)^{1-Y_i}$$

The $\hat{\beta}$ values that maximize the likelihood are the ML estimators of the parameters β The maximum likelihood estimators have many desirable statistical properties. As the number of samples increase:

The estimators are unbiased. ($E(\hat{\beta}) - \beta = 0$)

The estimators have minimal variance ($E(\hat{\beta} - E(\hat{\beta}))^2$)) among all estimators.

The shapes of the sampling distributions are normal.
$\sqrt{n}(\hat{\beta}-\beta) \sim N(0, \mathcal{I}^{-1})$ 3. Solving for $\beta$ Unlike ordinary least squares, for logistic regression there is not an algebraic solution for the coefficients. Instead, a numerical technique is used to estimate the set of coefficients most likely to generate the observed data.

For a random variable with density f(x), defined in terms of parameters $\beta$, the log likelihood of a parameter given data $X=(X_1, \ldots, X_m)$ is $$\log L(\beta \mid X_1, X_2, \ldots, X_m) = \sum_{i=1}^{m} \log f(X_i \mid \beta)$$

For the logistic link function, $$\log L(\beta \mid X_1, X_2, \ldots, X_m) = \sum_{i=1}^{m} [Y_i \log p_i + (1-Y_i)\log(1-p_i)]$$

$$= \sum_{i=1}^{m} \left[Y_i \log \frac{p_i}{1-p_i} + \log(1-p_i)\right]$$

$$= \sum_{i=1}^{m} [Y_i \beta X_i + \log(1-p_i)]$$

$$= \sum_{i=1}^{m} [Y_i \beta X_i - \log(1+e^{\beta X_i})]$$

The $\beta$ that maximizes the likelihood can be found through the scoring algorithm, which is Newton's method applied to the first derivative, in order to identify the maximum.

$$\hat{\beta}^{n+1} = \hat{\beta}^n + \mathcal{J}^{-1}(\hat{\beta}^n) V(\hat{\beta}^n)$$

where $\beta^n$ is the estimate for the parameters after n iterations, $V(\hat{\beta}^n)$ is the score function:

$$V(\hat{\beta}) = \frac{\partial}{\partial \beta} \log L(\beta \mid X)\Big|_{\beta=\hat{\beta}} = \frac{1}{L(\beta \mid X)} \frac{\partial L(\beta \mid X)}{\partial \beta}\Big|_{\beta=\hat{\beta}}$$

Or, in the model described herein:

$$V(\hat{\beta}) = \frac{\partial}{\partial \beta} \sum_{i=1}^{m} [Y_i \beta X_i - \log(1+e^{\beta X_i})]$$

$$= \sum_{i=1}^{m} \left[\frac{\partial}{\partial \beta} Y_i \beta X_i - \frac{\partial}{\partial \beta} \log(1+e^{\beta X_i})\right]$$

$$= \sum_{i=1}^{m} \left[Y_i X_i - \frac{X_i e^{\beta X_i}}{(1+e^{\beta X_i})}\right]$$

$$= \sum_{i=1}^{m} [Y_i X_i - X_i p_i]$$

$\mathcal{J}^{-1}(\hat{\beta}^n)$ is the inverse of the observed information matrix:

$$\mathcal{J}(\hat{\beta}) = -\nabla \nabla^T \log L(\beta \mid X_1, X_2, \ldots, X_m)\Big|_{\beta=\hat{\beta}}$$

$$= -\begin{pmatrix} \frac{\partial^2}{\partial \beta_1^2} & \cdots & \frac{\partial^2}{\partial \beta_1 \partial \beta_n} \\ \vdots & \ddots & \vdots \\ \frac{\partial^2}{\partial \beta_n \partial \beta_1} & \cdots & \frac{\partial^2}{\partial \beta_n^2} \end{pmatrix} \log L(\beta \mid X_1, X_2, \ldots, X_m)\Big|_{\beta=\hat{\beta}}$$

Or, in the model described herein:

$$\mathcal{J}(\hat{\beta}) = \frac{\partial}{\partial \beta} \sum_{i=1}^{m} [Y_i X_i - X_i p_i]$$

$$= -\sum_{i=1}^{m} \frac{\partial}{\partial \beta} X_i p_i$$

$$= -\sum_{i=1}^{m} X_i \frac{\partial}{\partial \beta} \frac{1}{1+e^{-\beta X_i}}$$

$$= -\sum_{i=1}^{m} X_i \frac{-1}{(1+e^{-\beta X_i})^2}(-X_i) e^{-\beta X_i}$$

$$= -\sum_{i=1}^{m} X_i p_i (1-p_i) X_i$$

4. Pseudo-Code Listing for Determining $\beta$ MLEs

Logistic regression solvers are available in many statistical software packages. The algorithm for finding $\hat{\beta}$ in matrix notation can be described as follows:

$\beta$ is a k×1 vector holding the parameters.

X is an m×k matrix, with a row for every measurement, and a column for every parameter if $\beta$.

Y is a m×1 vector holding the responses for each measurement.

A is a m×m diagonal matrix with entries equal to $p_i(1-p_i)$.

P is a m×1 vector of probabilities.

$\mathcal{J}$ is a k×k matrix holding the second derivatives of the log likelihood.

V is a k×1 vector holding the first derivative of the log likelihood.

$\mathcal{J}(\beta)$ can be written in matrix form as:

$$\mathcal{J}(\beta) = -XAX^T$$

Applying Newton's method gives:

$$\hat{\beta}^{n+1} = \hat{\beta}^n + (X^T A X)^{-1} X^T (Y-P)$$

The above can be repeated using the new values for A and P every round, until the $\beta$ values are stabilized, as determined by some stopping criteria, such as, for example:

$$\|\beta^n - \beta^{n-1}\|_2 < 10^{-6}$$

The following pseudo-code can be used to calculate $\beta$:

Require: X, data
Require: Y, response
Require: thresh, threshold for cutoff.
while diff>thresh do
  $\beta_{old} = \beta$
  $P \Leftarrow (1+\exp(\beta\beta X))^{-1}$
  $A = \text{diag}(P(1-P))$
  $\mathcal{J}^{-1} = (X^T A x)^{-1}$
  $\beta = \beta_{old} + \mathcal{J}^{-1} X^T (Y-P)$
  diff $= \|\beta - \beta_{old}\|_2$
end while Each iteration of Newton's method can be done in $O(md^2)$, where d is the number of parameters, and m is the number of data points to fit. The efficiency of the method can be improved by using a conjugate gradient (CG) method, to improve the directions of updates.

In practice, using the CG algorithm for tens of d, and several thousand m, the problem can be solved in less then one minute on a standard desktop computer.

5. Model Selection

In some embodiments, it is not known, prior to modeling, which parameters are the most useful, or which parameters should be included. A description of a stepwise procedure to select the best model follows.

The goal is to identify a model, which describes the observed data, with the minimum number of necessary parameters. To asses the goodness of fit, the Akaike information criterion (AIC) is used:

$$AIC = 2k - 2 \log L(\beta | X_1, X_2, \ldots, X_m)$$

where k is the number of parameters in the model, and $\log L(\beta | X_1, X_2, \ldots, X_m)$ is the same log likelihood as above. A model with a lower AIC score is preferred. The likelihood calculations are performed for each model to make sure that the maximum likelihood is used in each goodness of fit score.

Beginning with the simplest model, with only a constant term, the parameter that decreases the AIC the most is iteratively added from the set of available predictors. After each variable is added, any of the existing variables that is no longer significant is removed.

To avoid overfitting, any model that does not do better at predicting a subset of the data is rejected and not used in generating the model.

D. Estimating Total Attendance from User's Parameters

Given the probabilities of attendance for all users, features of the distribution of Y, the total attendance of the event, can be calculated.

In the event that users are considered independent ($P(Y_i Y_j) = P(Y_i)P(Y_j)$), the total number of attendees is given by $Y = \Sigma_i Y_i$. The variable Y has expectation $\mu = E(Y) = \Sigma_i p_i$, but because of the many $p_i$ values, there is not a closed form expression for variance.

Properties of the variance of Y are computable. Chernoff bounds exist to provide bounds on tail probabilities, which may be useful in producing confidence intervals for attendance.

$$P(Y < (1-\delta)\mu) < \left(\frac{e^{-\delta}}{(1-\delta)^{(1-\delta)}}\right)^\mu$$

and $$P(Y > (1+\delta)\mu) < \left(\frac{e^\delta}{(1+\delta)^{(1+\delta)}}\right)^\mu.$$

IV. Attraction and Venue Matching

In some embodiments, a matching system, such as, for example, the system 140 described with reference to FIG. 1C, is configured to match a venue with an attraction to create a proposed event when it is determined that the proposed event would be profitable. Profitability can account for some or all types of benefits that can result from a proposed event, including, for example, revenue, non-monetary benefits, goodwill, marketing, indirect benefits, competitive benefits, other benefits, or a combination of benefits.

An example of matching will now be described in the context of a venue that plans to sell tickets for a proposed event. The number of tickets sold to the event will depend at least in part on the local demand for the attraction or group of attractions that headline the event. In this context, the local demand is the popularity of the group of attractions among consumers residing in a geographical region surrounding the venue. The geographical region can be sufficiently large to encompass those consumers who can travel to the venue within a reasonable time, such as, for example, within about 10 minutes, within about 30 minutes, within about an hour, within about two hours, or within another reasonable period. The reasonableness of travel time can depend on many factors, such as, for example, the size of the venue hosting the event, the uniqueness of the event, the availability of other events in the geographical region, the locations of other venues, and so forth. A reasonable travel time for attending live music night at a bar would be less than the reasonable travel time for attending the Super Bowl. Alternatively, the geographical region considered can include the entire world, for example, if the distance between the consumer residence and the venue is a parameter used to filter out consumers who would likely not attend due to unreasonable travel times in predicting the probability of attendance.

Figure 6:
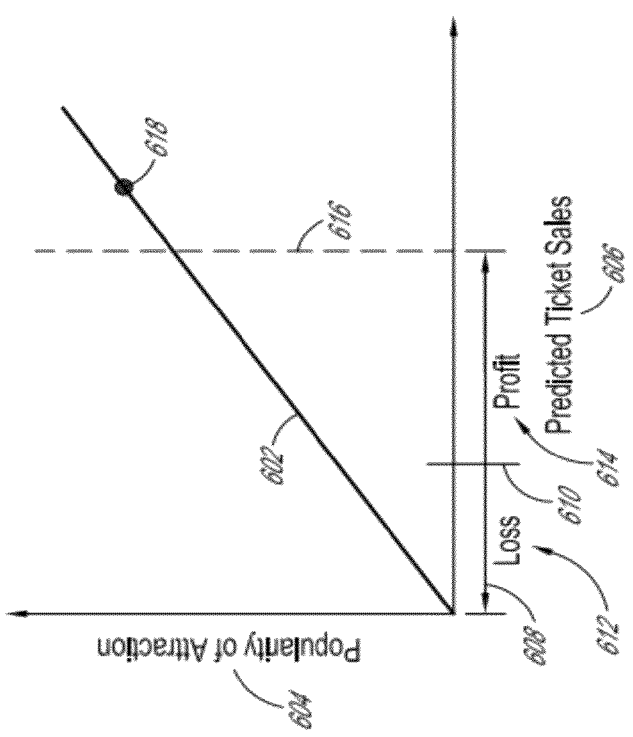
FIG. 6 is a plot showing a relationship between local demand for an attraction and predicted ticket sales.

FIG. 6 is a plot showing an example relationship 602 between local demand for an attraction (or popularity) and predicted ticket sales for an event featuring the attraction. The vertical axis 604 of the plot corresponds to the popularity of the attraction among consumers within a geographical area surrounding the venue. Popularity can be determined by weighted counts of local consumers' kicks, connections made in social networks, previous shows attended, other user parameter values, the proposed ticket price, the timing of the event, other factors, or a combination of factors. Any technique for predicting demand disclosed herein or any other suitable technique for predicting demand can be used. Many variations are possible.

The horizontal axis 606 of the plot corresponds to the predicted number of ticket sales for the event. A vertical line 616 intersecting the horizontal axis 606 shows the maximum capacity of the venue. A horizontal line 608 parallel to the horizontal axis 606 shows a range of potential profits for the event. A vertical line intersecting the horizontal line 608 represents an example break-even point 610 for the event. The position of the break even point 608 can be influenced by a variety of factors, such as, for example, one or more non-revenue components of profitability described previously, the cost of operating the venue, the cost of the attraction, the cost of running the event, the cost of marketing the event, and so forth. Events where the predicted number of ticket sales falls in a loss region 612 (for example, the number of ticket sales is less than the break even point 610) are considered unprofitable and may not result in a match between the venue and the attraction. Events where the predicted number of ticket sales falls in a profit region 614 (for example, the number of ticket sales is greater than or equal to the break even point 610) are considered profitable and may result in a match between the venue and the attraction or a proposed event. Where several events would be profitable over the same time period, the matching system can be configured to select only those events with the highest profitability. For example, the matching system con be configured to select events where the predicted ticket sales are closest to or furthest above the venue capacity 616, events where the break even point is lowest, and/or events where the revenue from predicted ticket sales exceeding the break even point is highest.

In some embodiments, the matching system is configured to match an attraction with a venue that has a capacity that is slightly or somewhat lower than the ticket sales prediction for an event. The matching system can be configured to determine a match threshold 618 where the demand for tickets will slightly or substantially exceed the supply of tickets by multiplying the venue capacity by a number greater than 1 (such as, for example, a number greater than or equal to about 1.05, greater than or equal to about 1.1, between about 1.01 and 1.5, between about 1.01 and 1.2, between about 1.1 and 1.5, or between any of the numbers listed) or by adding a predetermined value (such as, for example, 5, 10, 50, 100, 500, 1000, or a number between 5 and 1000 inclusive) to the venue capacity. The matching system can be configured to preferentially match attractions with venues where the projected ticket sales meet or exceed the match threshold 618. For example, if a band is predicted to sell 100 tickets to consumers within a small geographical area that has multiple venues, then the matching system can be configured to match the band with one or more venues in the area that have a capacity of about 90 guests.

In some embodiments, the matching system places a restriction on the number of times that an attraction, such as, for example, a band, appears within a geographic region. The restriction can configured to prevent or lessen the risk of overexposing a marketplace, particularly when a demand prediction model does not account for the possibility that a fan attending an event one night will be less likely to attend the event the following night. In certain embodiments, the matching system employs a model that does not count consumers who have recently participated in an event identical or similar to a proposed event.

V. Example Demand Prediction System Architecture

Figure 7:
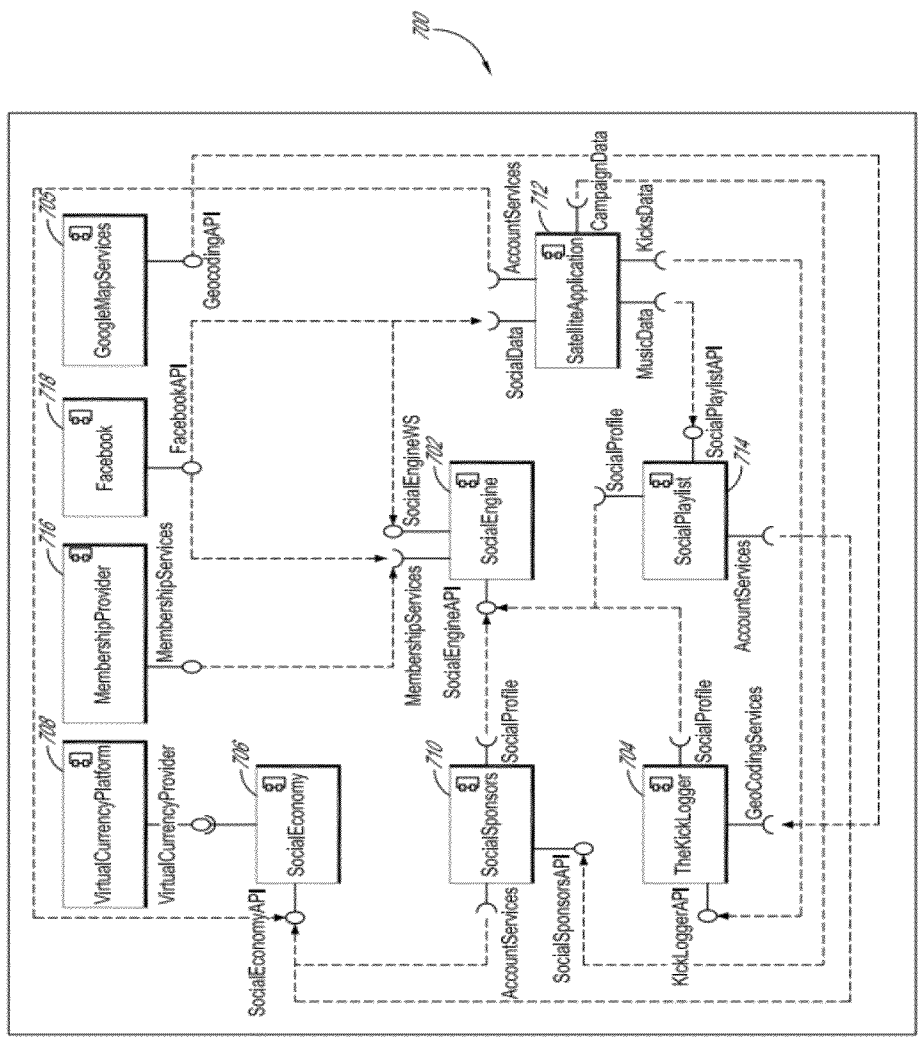
FIG. 7 illustrates an example demand prediction system including components for interfacing with various external services.
Figure 8:
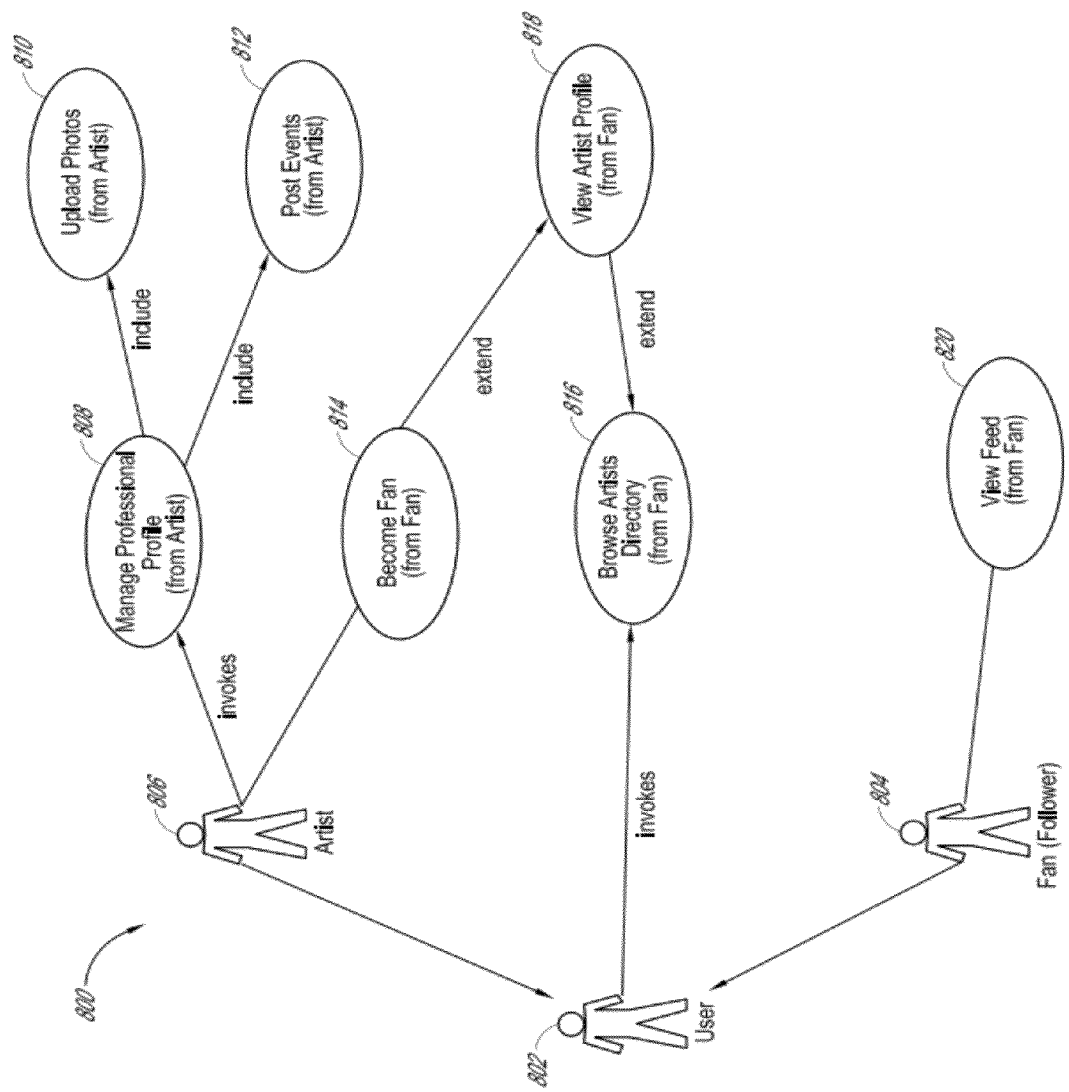
FIG. 8 illustrates overview of an example professional network in a social system.

The demand prediction systems disclosed herein can be implemented using hardware or software modules having any suitable architecture. Certain example architectures for the system will be disclosed by way of example, and not limitation. A demand prediction system can by organized into a plurality of components. FIG. 7 illustrates an example demand prediction system diagram 700 including components for interfacing with various external services. The diagram 700 depicts how a demand prediction system's components can interact with one another. Each component can be independent from the other components in terms of extensibility and upgrades The diagram 700 includes a component labeled "SocialEngine," which represents a social engine module 702. In the illustrated embodiment, the social engine module 702 is configured to create a social network that connects artists 806 with fans 804 of the artists (FIG. 8). This type of social network can be called a professional network. While this example uses an artist as an example of an attraction, it is understood that other types of attractions can be represented in the professional network. FIG. 8 is an overview of an example professional network 800 in a social system. In the professional network 800, users 802, such as artists 806 and fans 804, can perform one or more actions 808, 810, 812, 814, 816, 818, 818, 820. The actions accessible to a user 802 can depend on what role the user 802 plays in the professional network 800. In the illustrated example, an artist 806 is allowed to manage a profile 808, upload photos 810, and post events 812. An artist 806 user can be followed 814 by fans 804. A fan 804 is allowed to view a feed 820 of updates from artists 806 that are followed by the fan 804. The professional network 800 can include a variety of features, such as, for example, user profiles, groups, private messaging, journals, events, links, integration with third party messaging platforms (e.g., Twitter), notes, user and group photo galleries, comments, comment notification, friends, and settings for making profiles public, private, or invitation only. In some embodiments, fans 804 are not allowed to have their own profile. Instead, fans 804 have a summary page where they get a feed 820 from their favorite artists 806. Artists 806 can hold and manage professional profiles that enable them to update their fans with current activities, events, photos, and messages.

Figure 9:
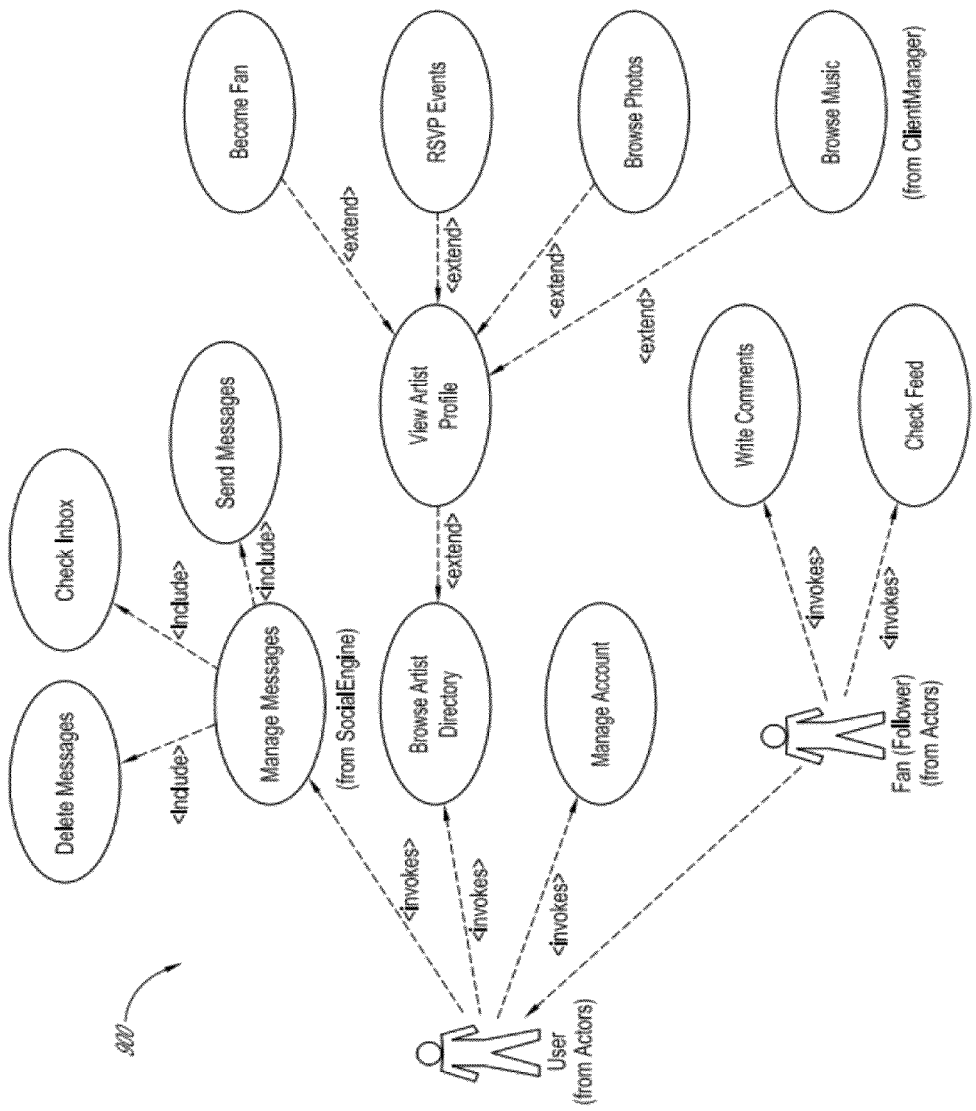
FIG. 9 illustrates an example fan interaction diagram within an embodiment of a demand prediction system.

FIG. 9 illustrates an example fan interaction diagram 900 within an embodiment of a demand prediction system. The fan interaction diagram 900 shows how fans 804 are allowed to interact with the professional network 800 shown in FIG. 8. For example, the fan interaction diagram 900 shows that fans 804 are able to post comments on the professional profile of an artist 806 and check updates from artists 806 that they follow.

Figure 10:
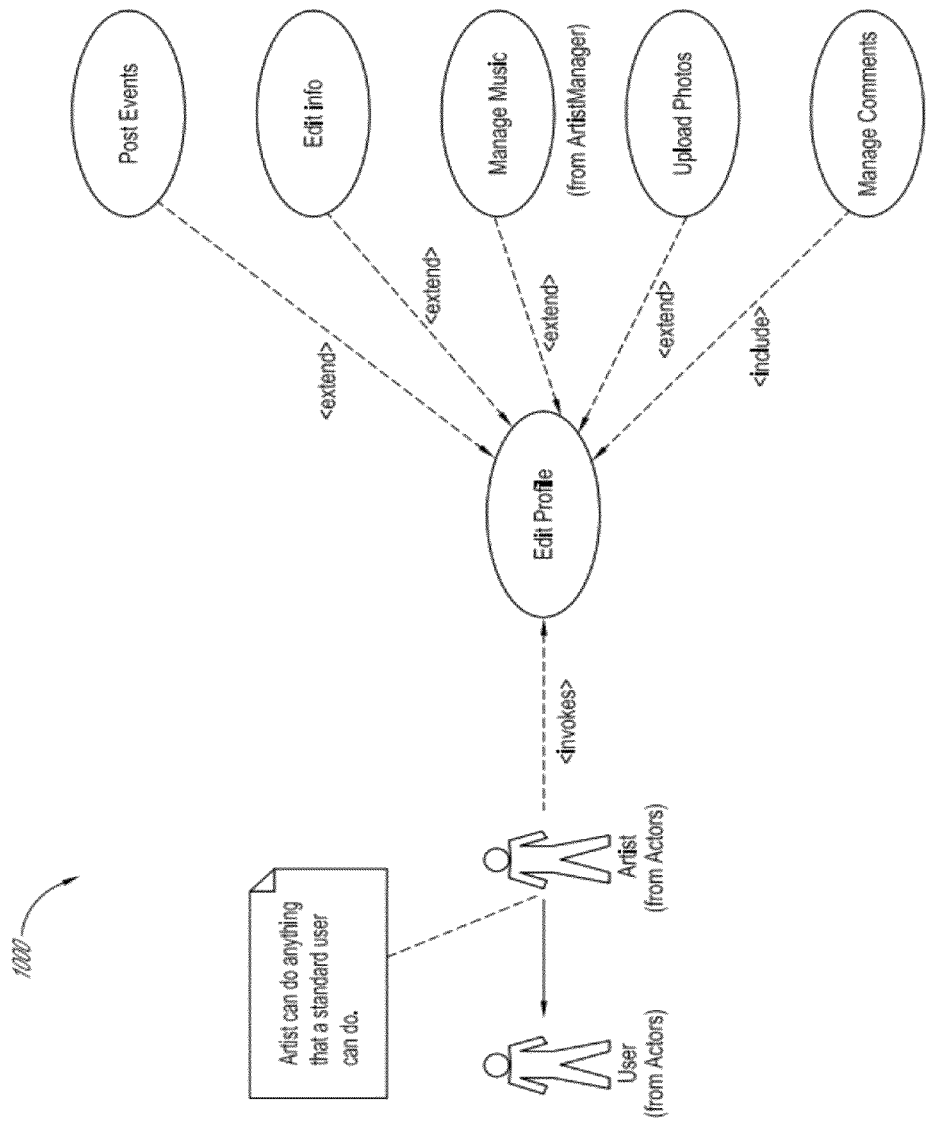
FIG. 10 illustrates an example artist interaction diagram with in an embodiment of a demand prediction system.

FIG. 10 illustrates an example artist interaction diagram 1000 within an embodiment of a demand prediction system. In the illustrated embodiment, an artist 806 is allowed to do anything that a user 802 is allowed to do. In addition, artists 806 are allowed to post events on their profile page, create albums of pictures and upload pictures, manage their music, manage comments from users, and edit information about themselves or their product.

A demand prediction system can be configured to allow users 802 and other consumers to indicate interest in an attraction. The demand prediction system diagram 700 includes a component labeled "TheKickLogger," which represents a kick logger module 704. The kick logger module 704 is configured to receive, aggregate, count, record, log, and/or detect indications of interest (or kicks) from consumers and to display statistical reports. In some embodiments, the demand prediction system is configured to receive direct indications of interest from consumers and/or to receive indirect indications of interest from consumers. Direct indications of interest can be received, for example, by providing a user interface element that is presented to a consumer in an application program or on a website. Operating the user interface element causes data to be sent to the demand prediction system, the data including, for example, information about the consumer who operated the user interface element, an identifier for the artist in which the consumer is interested, information about the time of the operation, information about the location of the consumer, other information, or a combination of information. Indirect indications of interest can be received, for example, by detecting when a consumer searches for an artist, visits an artist profile page, connects with an artist on a social network, mentions an artist in a message, or performs another action that indicates interest in the artist.

In some embodiments, the demand prediction system includes a component that is configured to crawl open websites and, with the permission of users, obtain other relevant information, including, for example, direct or indirect indications of interest, that can be used to add valuable factors for determining predicted demand for an attraction. For example, the component can be configured to collect data from Facebook, iTunes, band websites, Myspace, Ticketmaster, and so forth.

Figure 11:
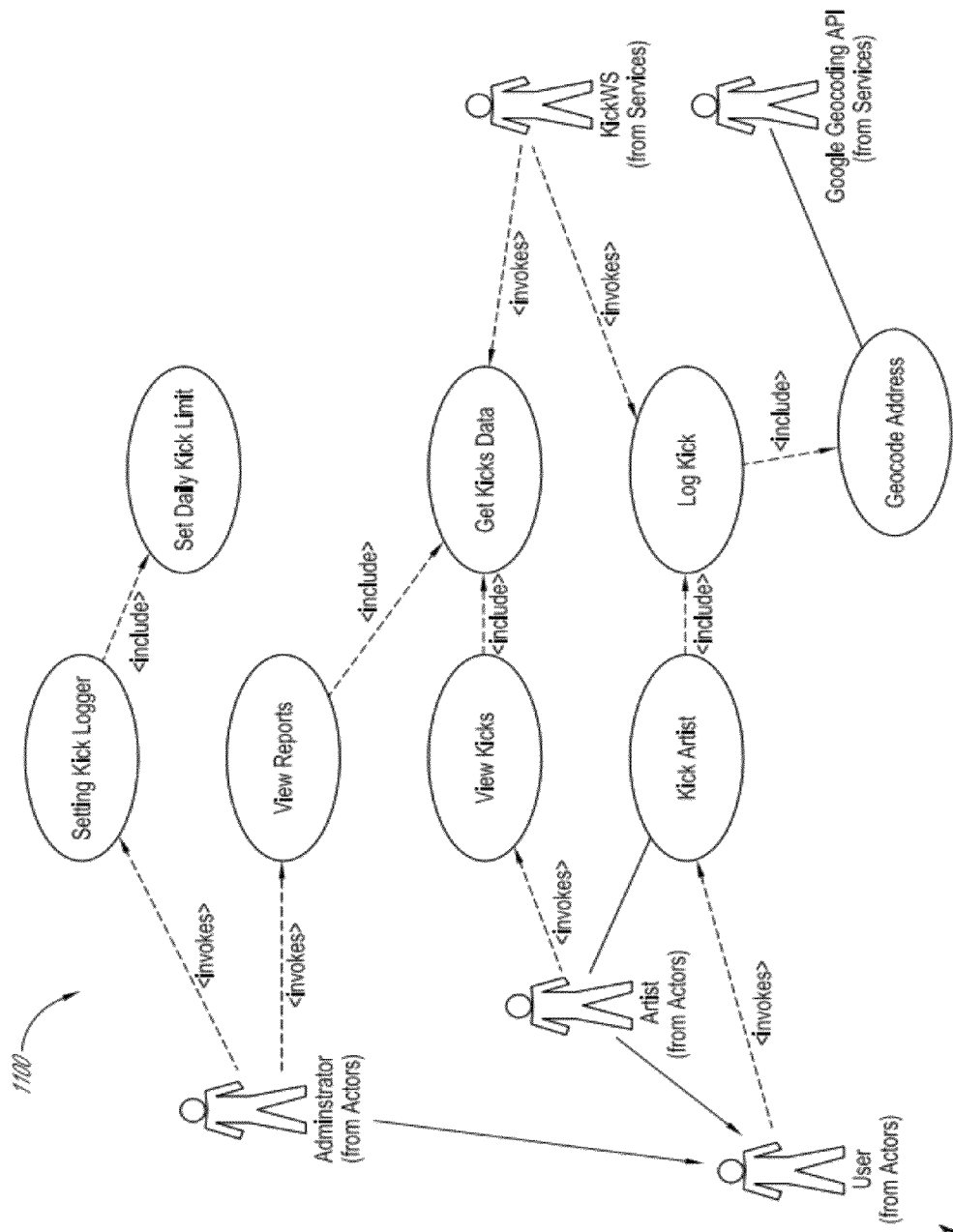
FIG. 11 illustrates an embodiment of user interaction with an interface for indicating interest in one or more attractions.

FIG. 11 illustrates a user interaction diagram 1100 that provides examples of how a user can interact with the kick logger module 704. In some embodiments, kicks that are recorded by the kick logger module 704 contain location information (for example, a latitude and longitude, Global Positioning System coordinates, an IP address, network information, or other information) for the user. Recorded information for kicks can also contain other relevant information. In some embodiments, the kick logger module 704 requires a user to provide a valid address before allowing the user to register interest in an artist. In certain embodiments, the kick logger module 704 uses a suitable geocoding service 705, such as, for example, the Google Geocoding API, to geocode user address information. As shown in FIG. 11, an administrator of the demand prediction system can establish limits on the number of kicks that a user can perform. The limits can be hourly limits, daily limits, weekly limits, monthly limits, limits within another suitable time period, limits that are algorithmically determined, limits that depend on usage, limits that depend on social influence, limits that depend on another factor, or limits that depend on a combination of factors. In some embodiments, a user is allowed to purchase or perform other actions to acquire additional kicks, including, for example, kicks that exceed an established limit.

Figure 12:
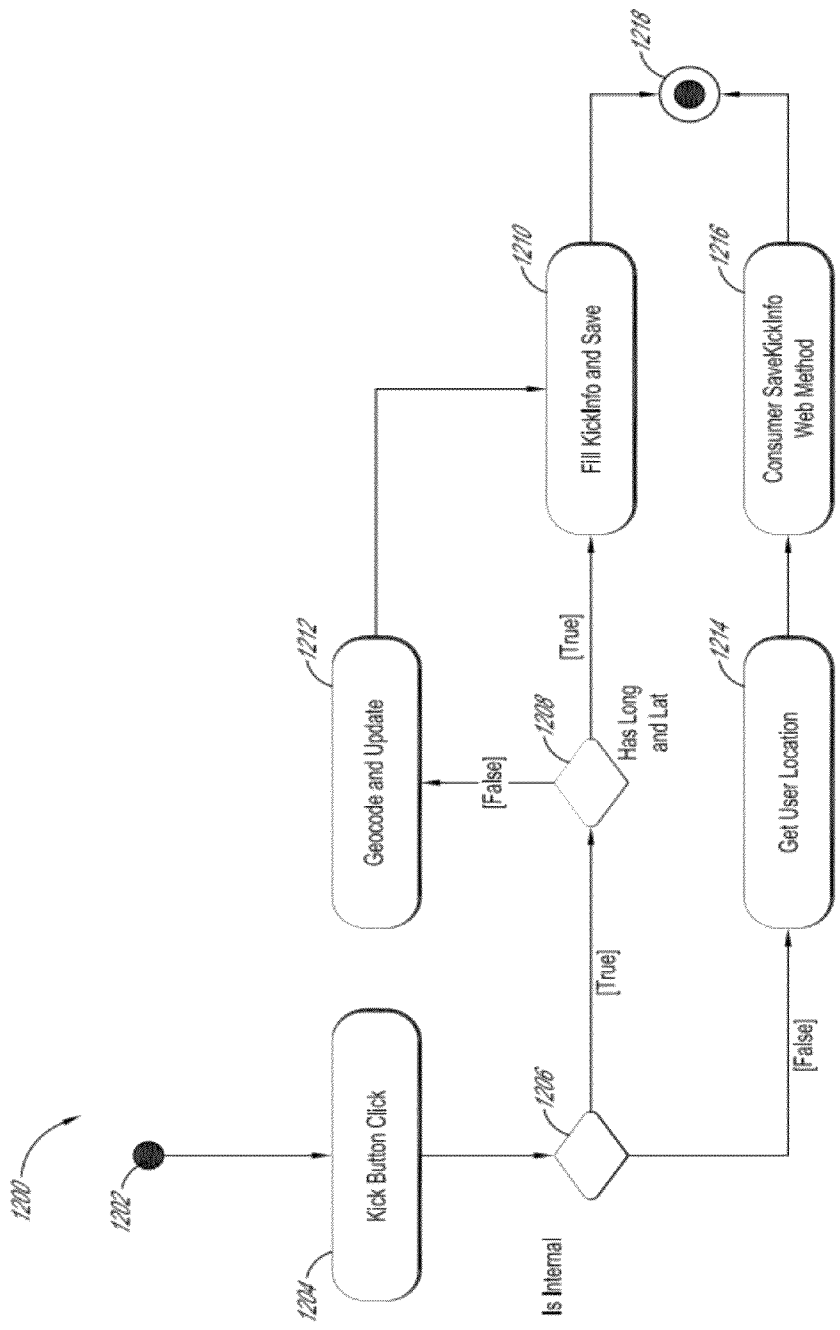
FIG. 12 illustrates a method for registering an indication of consumer interest in an attraction.

FIG. 12 illustrates a method 1200 for registering user interest in an attraction. At 1202, the consumer uses a website, an application, or a mobile application that sends indications of interest to the demand prediction system. At 1204, a user interface element is operated to indicate the consumer's interest in an attraction. At 1206, it is determined whether location information will be retrieved from a user profile or from a location service associated with the client used by the consumer. If the location information will be retrieved from a user profile (for example, if the consumer's address is already internal to the system or if the client used by the consumer does not have a location service), it is determined whether the location information is in the desired format (for example, the location information includes the longitude and latitude of the consumer) at 1208. If the location information is in the desired format, the indication of interest and location information is sent to the demand prediction system at 1210. If the location information is not in the desired format, the location information is converted to the desired format by geocoding or another suitable process at 1212. If additional location information is needed, it can be requested from the consumer before the indication of interest and location information is sent to the demand prediction system at 1210.

If the location information will be retrieved from a location service associated with the client used by the consumer, the user location is obtained using the location service at 1214. Clients that have a location service include, for example, certain mobile electronic devices, smartphones, tablet computers, and other electronic devices. A location service can automatically detect the user's geographical location via Global Positioning System (GPS), Assisted GPS, Simultaneous GPS, multilateration, Wi-Fi connection geolocation, IP address geolocation, another technique, or a combination of techniques, and share the location information with applications running on the device. At 1216, the indication of interest and location information is sent to the demand prediction system. The method ends at 1218, where the consumer may continue using the website, application, or mobile application.

VI. Examples of Revenue Generation Using a Demand Prediction System

In some embodiments, a demand prediction system includes an interface with a virtual currency platform and/or other services that can derive revenue from the demand prediction system. For example, the demand prediction system diagram 700 includes a component labeled "SocialEconomy," which represents a social economy module 706. The social economy module 706 is configured to interface with a virtual currency platform 708. The social economy module can provide users with virtual bank account services, earning management services, currency conversion services for converting real world currency to virtual currency, affiliate program services, or a combination of services. In some embodiments, users are allowed to earn credit and buy virtual goods within a website, application, or mobile application that sends indications of interest to the demand prediction system. The social economy module can be configured to offer services to other components of the demand prediction system through an application programming interface (API).

Figure 13:
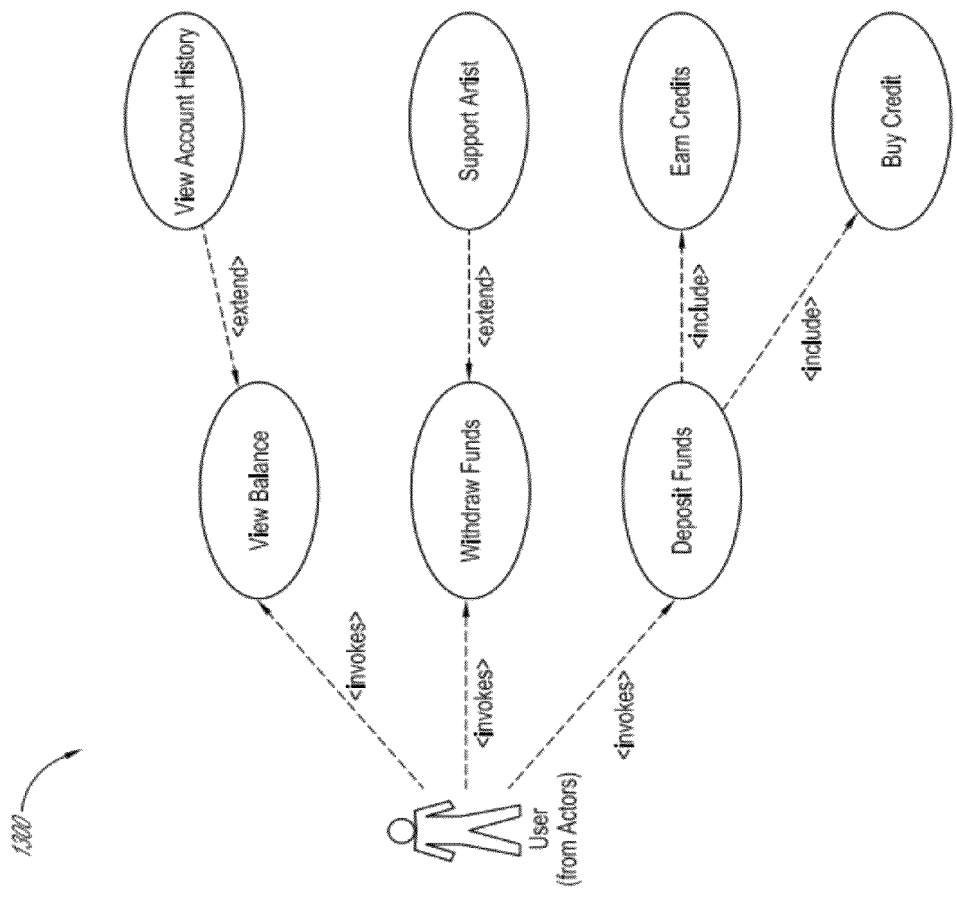
FIG. 13 illustrates an example of user interaction with a social bank account in an embodiment of a demand prediction system.

A virtual bank account or social bank account can allow users to manage internal virtual currency and to perform banking operations, such as, for example, deposits, withdrawals, money transfers, and account balance checks. FIG. 13 illustrates an example user interaction diagram 1300 showing how a user can interact with a social bank account in an embodiment of a demand prediction system.

Figure 14:
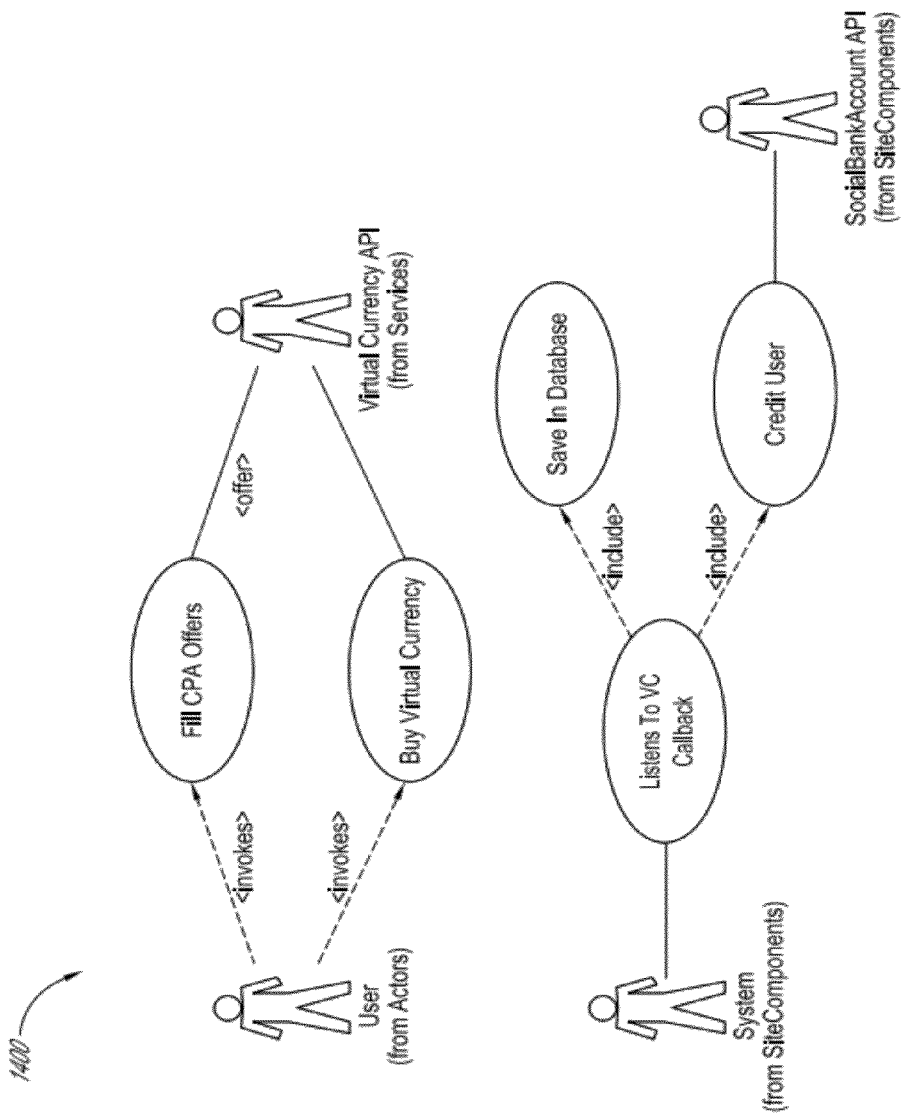
FIG. 14 illustrates an example of user interaction with a virtual currency platform in an embodiment of a demand prediction system.

A virtual currency platform 708 can allow users to earn credit and to convert local currency to virtual currency. FIG. 14 illustrates an example user interaction diagram 1400 showing how a user can interact with a virtual currency platform 708 in an embodiment of a demand prediction system. The demand predication system can be configured to present cost per action (CPA) offers to users of the system. Users are permitted to complete the CPA offers that allow the users to earn credit in the form of virtual currency. Users are also permitted to buy virtual currency by using real world money. In certain embodiments, a consumer can upload real world money to the virtual currency platform using a standard payment method (for example, credit cards or Paypal), or the consumer can choose to answer questions provided by advertisers in order to earn points or virtual currency. The points or virtual currency that a user earns can be spent in a website, application, or mobile application for various goods and services. In some embodiments, virtual currency held by users is not allowed to be cashed out (for example, converted into real-world cash). In certain such embodiments, artists are allowed to cash out virtual currency by converting it into real-world cash.

Figure 15:
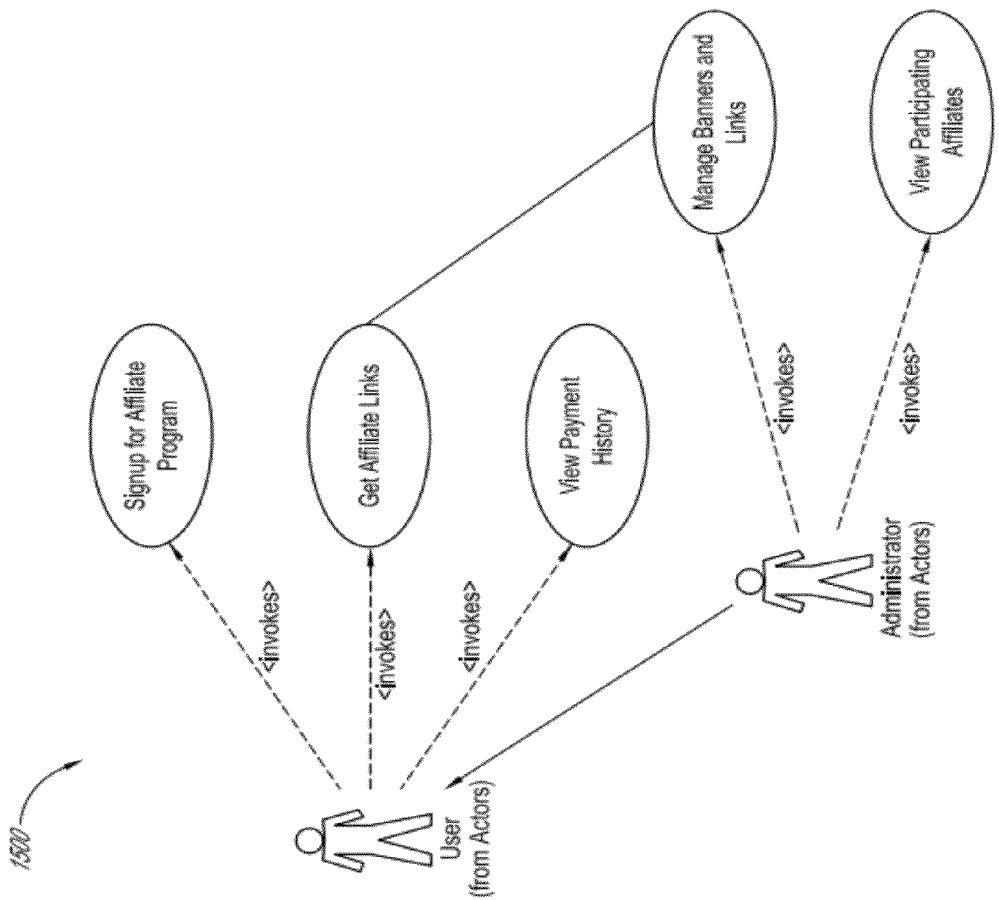
FIG. 15 illustrates an example of user interaction with an affiliate program in an embodiment of a demand prediction system.

A demand prediction system can include an affiliate program that permits users to earn credit or virtual currency by referring other users to a website, an application, or a mobile application that send indications of interest to the demand prediction system. In some embodiments, users can place a banner advertisement or a link within an external web page, application, or mobile application that sends other users to a website, an application, or a mobile application that send indications of interest to the demand prediction system. The demand predication system can be configured to track the number of users that arrive at an affiliated website, application, or mobile application by clicking on an advertisement or link placed by a user. The amount of credit or virtual currency earned by the user can depend on the number of users redirected using such advertisements or links. FIG. 15 illustrates an example user interaction diagram 1500 showing how a user can interact with an affiliate program in an embodiment of a demand prediction system.

In some embodiments, a demand prediction system includes an interface with a sponsorship platform. For example, the demand prediction system diagram 700 includes a component labeled "SocialSponsors," which represents a social sponsor module 710. The social sponsor module 710 is configured to provide support for campaign management, sponsorship for artists, and other advertising. The social sponsor module 710 can be configured to handle simple advertising campaigns and more complicated campaigns, such as, for example, a campaign that only shows advertisements on an artist's profile page. The social sponsor module 710 can include components for displaying banner advertisements and managing banner advertisements.

Figure 16:
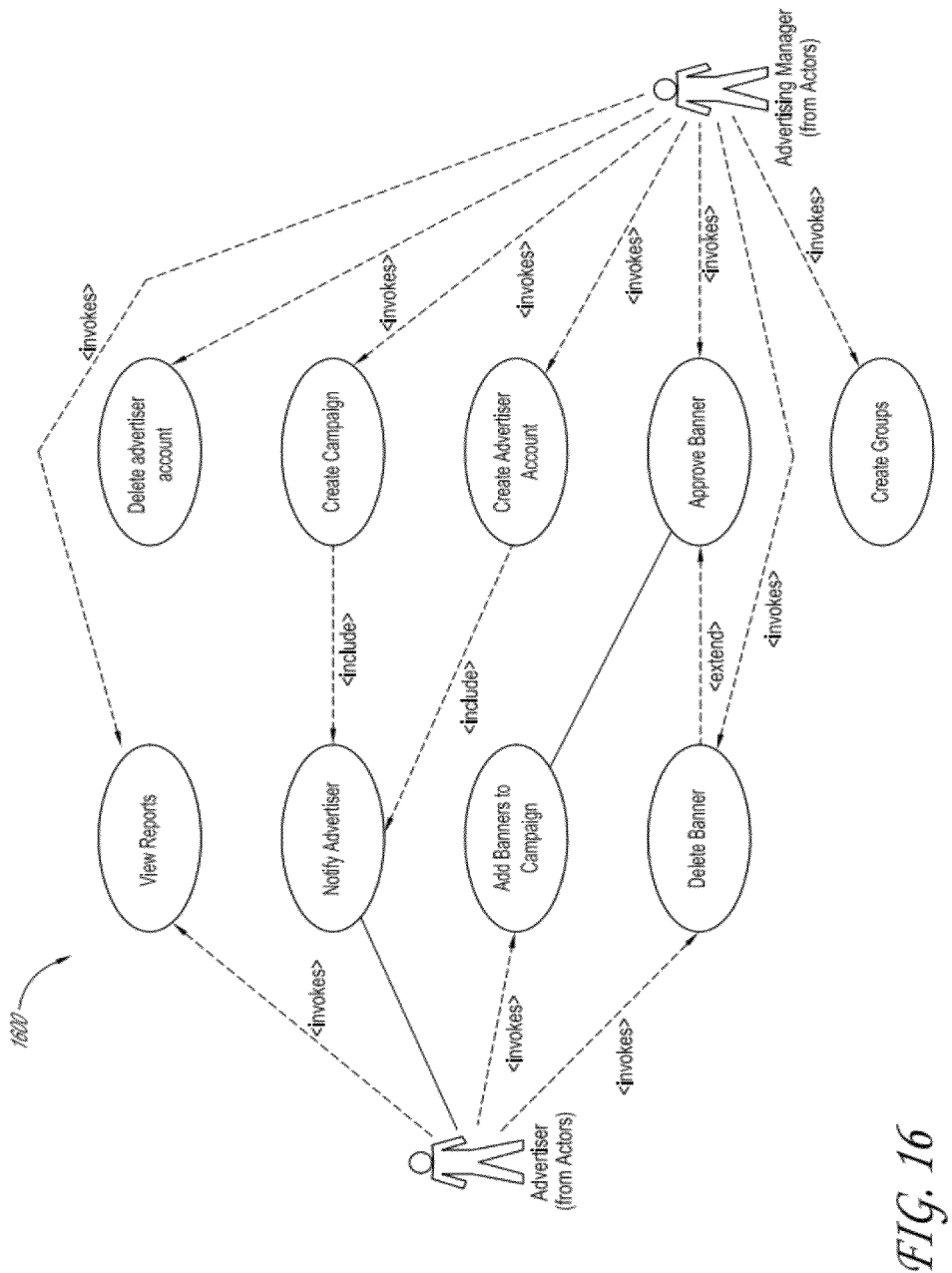
FIG. 16 illustrates in embodiment of advertiser interaction with an advertising manager in an embodiment of a demand prediction system.

In some embodiments, the social sponsor module 710 permits advertisers to create campaigns that allow customization of advertisements and advertisement delivery preferences. The banner advertiser manager component can be configured to create campaigns for advertisers, receive banner advertisements from advertisers, and provide reports on advertising metrics. The social sponsor module 710 can be configured to allow an advertiser to choose a target market segment, such as, for example, a local, national, or regional target market, and customize the audience that will view advertisements. In certain embodiments, the social sponsor module 710 permits a user to acknowledge that an advertisement has been viewed via a user interface element. In further embodiments, the social sponsor module 710 permits a user to respond to advertisements or perform an action invited by an advertisement. The social sponsor module 710 can be configured to automate the creation of layouts and/or graphics for advertisements. For example, it can provide predefined templates for the advertiser to use, or the advertiser can have the option of using its own layouts and/or graphics. FIG. 16 is an example advertiser interaction diagram 1600 showing how an advertiser can interact with a banner advertiser manager component in an embodiment of a demand prediction system.

Some embodiments permit responses to be solicited from a consumer viewing an advertisement. For example, a response-based advertisement may invite the user to provide an opinion about the subject of the advertisement. The response can be solicited by one or more yes/no questions, multiple-choice questions, or free-form response questions. When a consumer enters a response, the demand prediction system can be configured to award points or virtual currency to the consumer.

In certain embodiments, an operator of the demand prediction system takes a percentage of the cost of the advertising campaign. Additionally or alternatively, the operator can require the advertiser to pay the operator for each response performed by a targeted consumer until the campaign is over. The banner advertiser manager component can be configured to generate a report with the results of the consumer's response. The results can include user demographics provided by the consumer if the consumer allows such information to be shared. The banner advertiser manager component can send the report to the advertiser in a periodic, intermittent, or continuously-updated manner.

Figure 17:
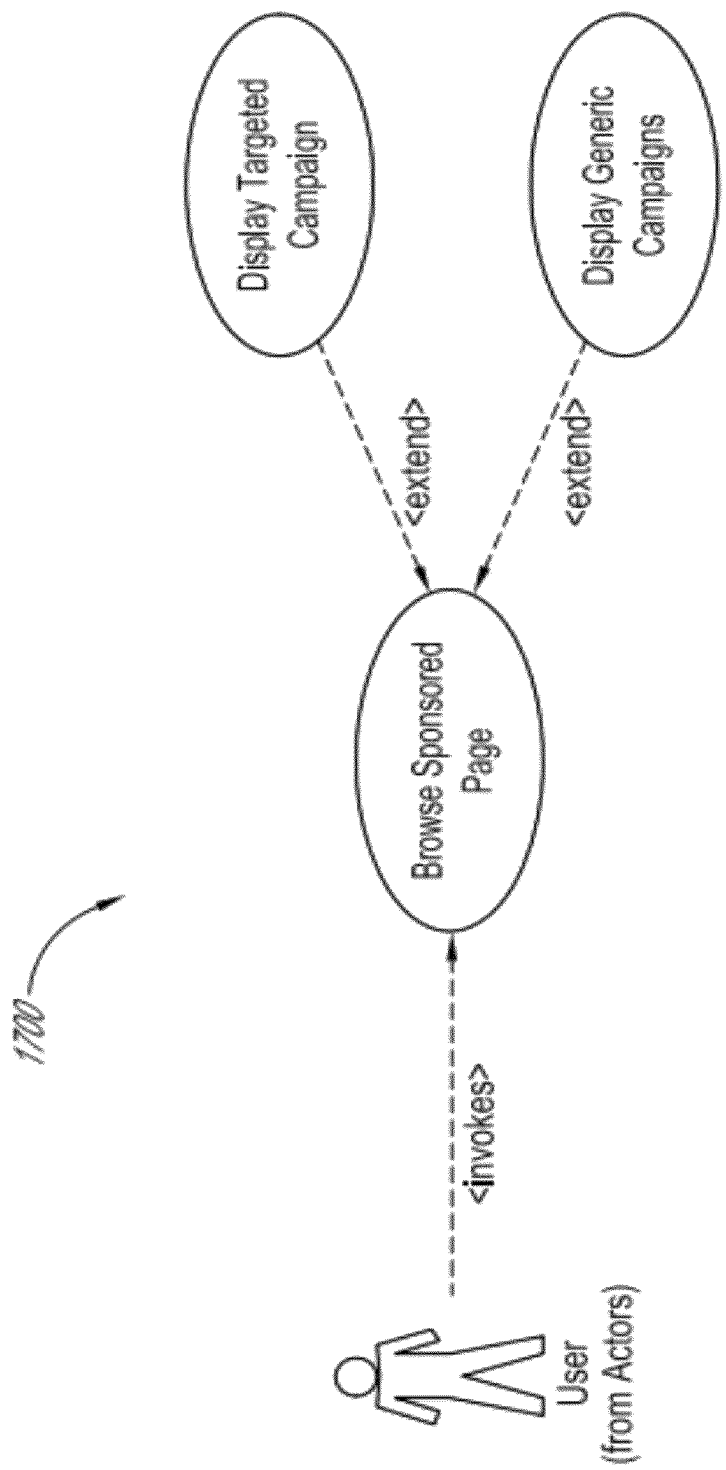
FIG. 17 illustrates an example of user interaction with a banner display in an embodiment of a demand prediction system.

The social sponsor module 710 can include a banner advertisement display component that is configured to displayer banner advertisements. The banner display component can place banner advertisements in an advertising space available within a website, application, or mobile application that provides indications of interest to the demand prediction system. In some embodiments, an artist can place a banner advertisement area on his or her profile page, and the banner advertisement display component can be configured to fill the advertisement area with advertisements from his or her sponsors. FIG. 17 is an example user interaction diagram 1700 showing how a user can interact with a banner advertisement display component in an embodiment of a demand prediction system.

VII. Other Demand Prediction System Components

Figure 18:
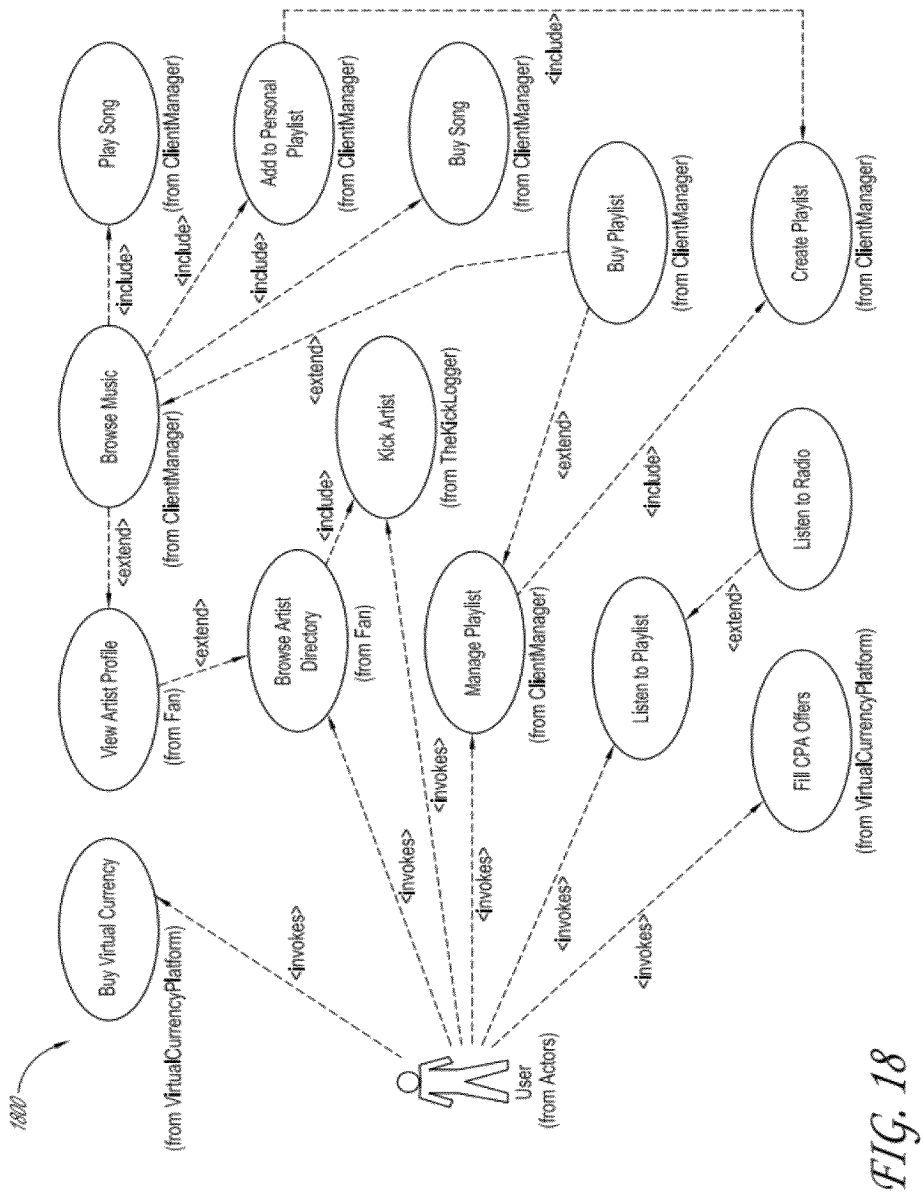
FIG. 18 illustrates an example of user interaction with satellite applications in an embodiment of a demand prediction system.

In some embodiments, a demand prediction system is configured to connect to one or more applications or mobile applications (collectively, "satellite applications"). For example, the demand prediction system diagram 700 includes a component labeled "SattelliteApplication," which represents a satellite application module 712. The satellite application module 712 can be configured to allow a satellite application to access data in the demand prediction system through an extensible web services framework or through any other suitable data interface. FIG. 18 illustrates an example user interaction diagram 1800 showing how a user can interact with one or more satellite applications in an embodiment of a demand prediction system.

Figure 19:
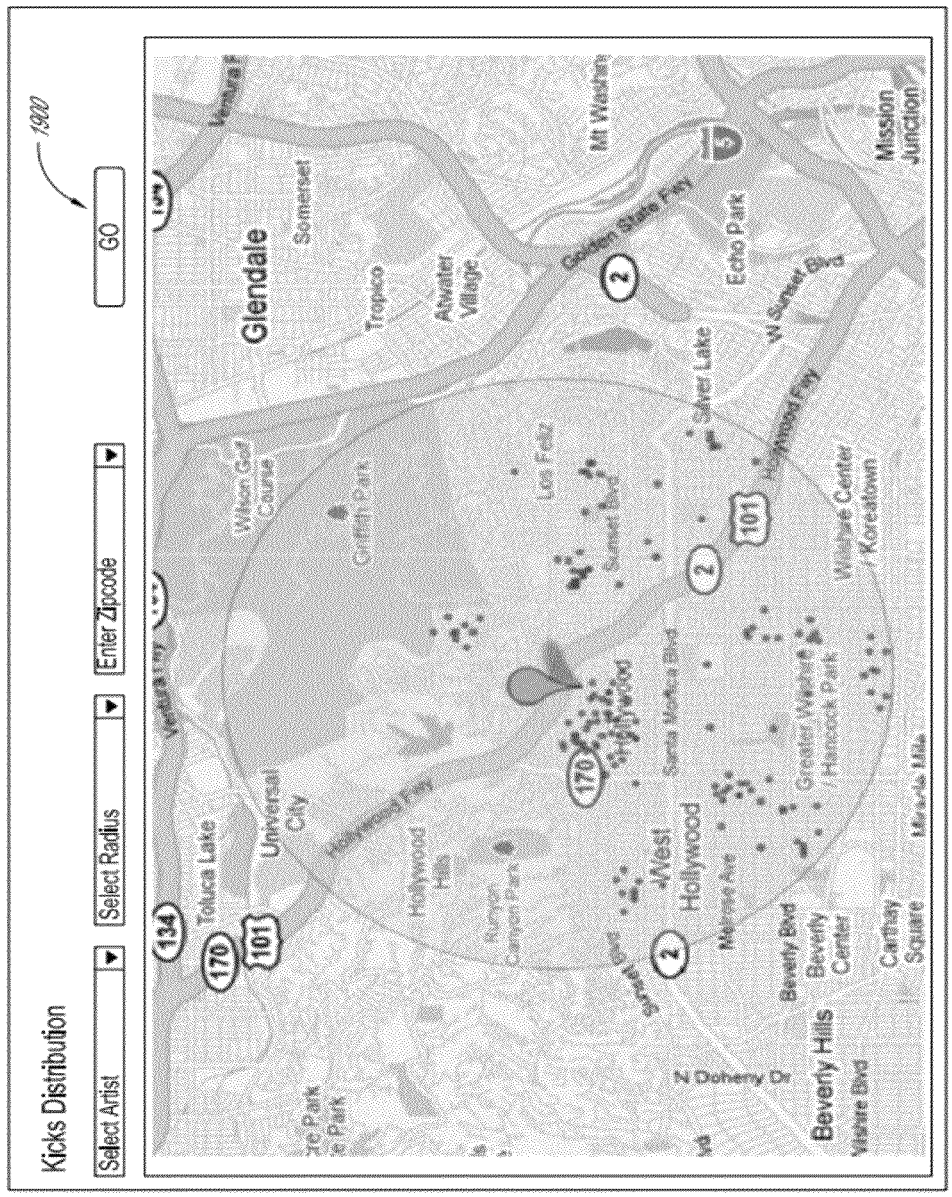
FIG. 19 illustrates an example of an interface for viewing a distribution of kicks.

The demand prediction system can interact with users via one or more suitable graphical user interfaces. The graphical user interfaces are configured to allow users to enter data into the system; browse profiles, music, directories, and playlists; indicate interest in attractions; and perform other actions described or illustrated herein. In some embodiments, the graphical user interfaces include reporting tools that allow administrators, fans, or artists to view kick reports. For artists and administrators, a view can be provided to show a distribution of kicks on a map. FIG. 19 illustrates an example of an interface 1900 for viewing a distribution of kicks.

In some embodiments, a demand prediction system includes a social playlist module 714 configured to provide access to music-related data. The music-related data can include, for example, users' personal playlists, artists' playlists, and purchased songs. User membership information, including, for example, login information, personal information, contact information, and/or user settings, can be stored in a membership provider module 716, in a third party membership service 718, or in a combination of locations.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various illustrative logical blocks, modules, data structures, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, data structures, and processes described herein may be implemented or performed by a machine, such as a computer, a processor, a digital signal processor (DSP), an application specific integrated circuit (ASIC), a filed programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices—for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a non-transitory computer-readable storage medium such as RAM memory, flash memory, ROM memory, EPROM memory, EEPROM memory, registers, a hard disk, a removable disk, a CD-ROM, memory capable of storing firmware, or any other form of computer-readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

What is claimed is:

1. A system for matching a venue with one or more performers, the system
comprising:
a database that stores information about venues for holding performances, performers that perform acts of entertainment, and fans of the performers;
a computer that has access to the database and that is configured to:
receive indications of interest from fans, wherein each indication of interest is an action taken by a fan that shows that the fan has interest in a specific performer;
determine, based upon the indications of interest, interest metrics representing individual fans' degree of interest in specific performers;
determine distances between geographic locations of fans and venues;
determine participation metrics representing each fan's rate of participation in past performances;
determine social influence metrics representing likelihoods that fans will be influenced by actions of others;
weight the interest metrics, distances, participation metrics, and social influence metrics according to their relative importance in calculating the likelihoods of attendance;
calculate likelihoods that specific fans would attend a performance by a specific performer at a specific venue, wherein the calculation takes into account the interest metrics, distances, participation metrics, and social influence metrics;
calculate an estimate of attendance at a performance by a specific performer at a specific venue by summing the likelihoods that specific fans would attend the performance; and
use the calculated estimate of attendance to match a venue with a performer.

2. The system of claim 1, further comprising a fan feedback subsystem configured to record the fan actions that constitute indications of interest.

3. The system of claim 2, wherein the fan feedback subsystem comprises a user interface element operable by the fans to indicate interest in a particular performer.

4. The system of claim 3, wherein the user interface element is configured to be operated repeatedly, and wherein a value of an interest metric may be based on a number of times that the user interface element is operated.

5. The system of claim 4, wherein the number of times in an interval that a fan can operate the user interface element is limited.

6. The system of claim 1, wherein the interest metrics are based in part on indications of how recently the indication of interests occurred.

7. The system of claim 1, wherein the interest metrics are used to calculate estimated attendance for performances by performers that are similar to specific performers for whom fans have made indications of interest.

* * * * *